US009376901B2

(12) United States Patent
Pantano

(10) Patent No.: US 9,376,901 B2
(45) Date of Patent: Jun. 28, 2016

(54) INCREASED RESOURCE RECOVERY BY INORGANIC AND ORGANIC REACTIONS AND SUBSEQUENT PHYSICAL ACTIONS THAT MODIFY PROPERTIES OF THE SUBTERRANEAN FORMATION WHICH REDUCES PRODUCED WATER WASTE AND INCREASES RESOURCE UTILIZATION VIA STIMULATION OF BIOGENIC METHANE GENERATION

(76) Inventor: John Pantano, Butte, MT (US)

( * ) Notice: Subject to any disclaimer, the term of this patent is extended or adjusted under 35 U.S.C. 154(b) by 878 days.

(21) Appl. No.: 13/237,718

(22) Filed: Sep. 20, 2011

(65) Prior Publication Data
US 2013/0068462 A1    Mar. 21, 2013

(51) Int. Cl.
*E21B 43/17* (2006.01)
*E21B 43/25* (2006.01)

(52) U.S. Cl.
CPC ..................... *E21B 43/25* (2013.01)

(58) Field of Classification Search
CPC .......... C10G 1/04; C10G 2/50; E21B 43/162; E21B 43/17
USPC ........................................................ 166/305
See application file for complete search history.

(56) References Cited

U.S. PATENT DOCUMENTS

| | | | |
|---|---|---|---|
| 2,218,306 A | 10/1940 | Austerman |
| 2,672,201 A | 8/1954 | Lorenz |
| 2,799,342 A | 7/1957 | Fatt |
| 2,872,982 A | 2/1959 | Wade |
| 2,881,837 A | 4/1959 | Staudt |
| 2,889,884 A | 6/1959 | Henderson |
| 3,386,511 A | 6/1968 | Messina |
| 3,896,879 A | 7/1975 | Sareen |
| 4,007,791 A | 2/1977 | Johnson |
| 4,085,799 A | 4/1978 | Bousaid |
| 4,448,253 A | 5/1984 | Southwick |
| 4,590,997 A | 5/1986 | Stowe |
| 4,634,540 A | 1/1987 | Ropp |
| 4,848,468 A | 7/1989 | Hazlett |
| 5,083,615 A | 1/1992 | McLaughlin |
| 5,322,121 A | 6/1994 | Hrachovy |
| 5,979,557 A | 11/1999 | Card |
| 6,444,316 B1 | 9/2002 | Reddy |
| 6,543,535 B2 | 4/2003 | Converse |
| 6,966,379 B2 | 11/2005 | Chatterji |
| 7,210,528 B1 | 5/2007 | Brannon |
| 7,341,103 B2 | 3/2008 | Taylor |
| 7,393,423 B2 | 7/2008 | Liu |
| 7,458,424 B2 | 12/2008 | Odeh |

(Continued)

OTHER PUBLICATIONS

Dolfing et. al, Thermodynamic constraints on methanogenic crude oil biodegradation, The ISME Journal, 2007, 442-452, 2(4), Nature Publishing Group, USA.

(Continued)

*Primary Examiner* — Doug Hutton, Jr.
*Assistant Examiner* — Ashish Varma
(74) *Attorney, Agent, or Firm* — Douglas Baldwin

(57) ABSTRACT

Methods of resource recovery include reagents placed in a subterranean formation. The reagents generate heat, hydrogen gas and alkalinity which changes fluid flow characteristics. The forces of the reactions create fractures and cracks far from the well bore. These cracks and fractures are sealed if water is being transmitted through or near the reactions. As a result, the targeted fluids more efficiently flow to the well, along with decreased amounts of water waste, while stimulating generation of biogenic gases in the subterranean formations.

33 Claims, 6 Drawing Sheets

(56) References Cited

U.S. PATENT DOCUMENTS

| | | |
|---|---|---|
| 7,533,723 B2 | 5/2009 | Hughes |
| 7,581,594 B2 | 9/2009 | Tang |
| 7,588,081 B2 | 9/2009 | Pfeiffer |
| 7,624,743 B2 | 12/2009 | Sarkar |
| 7,640,978 B2 | 1/2010 | Pfeiffer |
| 7,798,221 B2 | 9/2010 | Vinegar |
| 7,845,403 B2 | 12/2010 | Pfeiffer |
| 7,946,342 B1* | 5/2011 | Robertson ................ C09K 8/58 166/263 |
| 7,977,056 B2 | 7/2011 | Toledo |
| 2003/0080604 A1* | 5/2003 | Vinegar ................ E21B 43/243 299/14 |
| 2004/0033557 A1 | 2/2004 | Scott |
| 2009/0286702 A1 | 11/2009 | Huang |
| 2009/0305915 A1 | 12/2009 | Huang |

OTHER PUBLICATIONS

Holowenko et. al, Naphthenic acids and surrogate naphthenic acids in methanogenic microcosms , Water Research, 2001, 2595-2606, 35(11), Elsevier Ltd., USA.

Winfrey et. al, Association of hydrogen metabolism with methanogenesis in Lake Mendota sediments, Applied and Environmental Microbiology, 1977, 312-318, 33(2), American Society for Microbiology, USA.

* cited by examiner

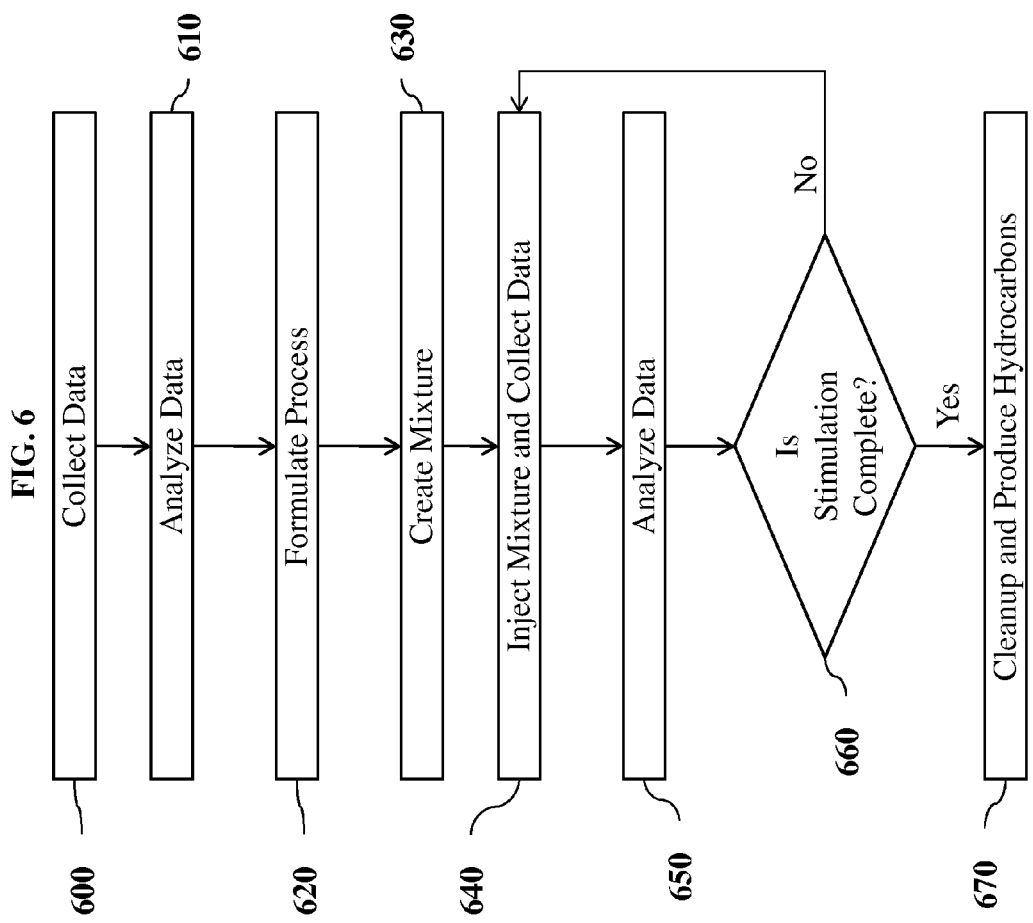

INCREASED RESOURCE RECOVERY BY INORGANIC AND ORGANIC REACTIONS AND SUBSEQUENT PHYSICAL ACTIONS THAT MODIFY PROPERTIES OF THE SUBTERRANEAN FORMATION WHICH REDUCES PRODUCED WATER WASTE AND INCREASES RESOURCE UTILIZATION VIA STIMULATION OF BIOGENIC METHANE GENERATION

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

Field of Invention

This method relates to the recovery of natural resources from subterranean formations. More specifically, the invention relates to chemicals being delivered to the subsurface for improvement of hydrocarbon or other preferred fluid movement to a well while restricting unwanted water movement and stimulating production of biogenic methane.

Introduction

Recovering hydrocarbons from the subsurface involves many challenges. The dynamics of reactive multiphase fluid flow in porous media are responsible for the complexity. Many factors control the rate of fluid movement. Improvements in conditions for maximum recovery of hydrocarbons rely on changing the pressure difference between the production wells and the subsurface, changing the properties of the porous media, changing the properties of the fluids, and changing the chemistry of both the fluids and the solids.

Methodologies to improve hydrocarbon recovery include the following:
1. Hydraulic fracturing
   a. Explosives for fracturing
   b. Pulse fracturing
   c. Proppants and fluids
2. Chemical Reactions
   a. Reagents that produce heat and gas
   b. Water blocking chemical treatments
   c. Paraffin build up removal
   d. Water consuming reactions
3. Biogenic gas stimulation
4. Changing surface tension and viscosity of hydrocarbons
   a. By chemicals
      i. Composition of organic compounds
      ii. Miscible gas concentrations
      iii. Chemical additives
   b. By temperature Hydraulic Fracturing Recovery of minerals and fluids from underground formations of relatively low permeability can be enhanced by fracturing the formation rock to create areas of high permeability. One commonly employed technique is hydraulic fracturing. In this technique, a fracturing fluid is injected into the formation through a borehole at a pressure above the formation breakdown pressure. The fracture initiates at the borehole and propagates outward into the formation in a radial manner. While this technique is generally useful, complete radial coverage of the formation and a controlled propagation of the fracture with increasing distance from the borehole are not achieved.

The use of explosives implanted in crevices, cracks, or fissures is common in mining and quarrying operations. Such explosives have included both solid and liquid-type explosives. The detonation of an explosive device or materials in a borehole to achieve explosive fracturing of the surrounding formation, however, suffers from the same disadvantage noted above with respect to hydraulic fracturing operations; namely, the difficulty of propagating the fracture at increasing distances from the injection borehole. Explosive fracturing by the detonation of an explosive device in a borehole also requires a subsequent cleanup operation before hydrocarbon recovery can begin, increasing both the time and expense.

Hydraulic fracturing can also be done by using an explosive to generate a high speed gas flow, which is a process called propellant stimulation. Propellant stimulations can improve hydrocarbon recovery. Propellants are low-explosive materials that generate pressurized gas very rapidly. The gas pressure builds in the wellbore, increasing tension in the rock until it becomes greater than the breakdown pressure of the formation. Fracture length and fracture pattern are highly dependent on the type of propellant and tools that are used in stimulation operations U.S. Pat. No. 5,083,615 describes a gas-generating chemical reaction carried out in a borehole that generates substantial pressure. Pressure increase in the borehole can be used to fracture rocks or coal seams around a borehole.

U.S. Pat. No. 7,393,423 uses a chemical reaction between molten aluminum (Al) and an oxygen carrier, such as water, to do useful work. The produced Al in its liquid form is forced to react with an oxygen carrying liquid (e.g., water), giving off heat and releasing hydrogen gas or other gaseous material. Some aluminum in its molten state is projected into the perforation and forced to react with water that also enters the perforation, creating another explosion, fracturing the crushed zone of the perforation and initializing cracks. U.S. Pat. No. 7,393,423 also shows methods to build and to detonate or fire explosive devices in an oxygen carrying liquid (e.g., water) to perforate and stimulate a hydrocarbon-bearing formation. This method is limited by the use of molten Al. Also, the location where the explosion can be set is limited to in or near the borehole. Moreover, the timing of the explosion is limited to a short period of time after placement.

Fluids used in the stimulation of hydrocarbon resources have many functions. The different components are water-based polymers, friction reducers, fluid-loss additives, breakers, emulsifiers, clay stabilizers, surfactants, nonemulsifiers, pH-control additives, crosslinkers, foamers, gel stabilizers, defoamers, oil-gelling additives, biocides, water-based gel systems, crosslinked gel systems, alcohol-water systems, oil-base systems, polymer plugs, continuous mixed gel concentrates, resin-coated proppants, intermediate-to-high-strength ceramics, natural material proppants and many additional components (Fink, 2003). The use of the different components in specific formulations allows for the preferred function to be achieved.

U.S. Pat. No. 6,966,379 describes methods where fracturing fluid is made by combining a gelling agent, proppant and a surfactant. The initial pH is set such that the surfactant foams keep the proppant in suspension. When the pH of the mixture changes, the surfactant, gel, and proppant mixture defoams. When the solution defoams, the proppant is deposited at that location. The pH of the fracturing fluid can be changed via contact with naturally occurring acidic water. These methods allow for the proppant to be placed by formulating a mixture of components to react with in-situ conditions.

U.S. Pat. No. 7,210,528 presents the theory "that the enhanced effective length of the propped fracture is attributable to the reduced cross-sectional flow area existing above the settled bank. Where the first proppant stage is used to propagate the fracture, it is believed that the reduced cross-sectional flow area exists above the settled bank generated by this first proppant stage. Assuming constant pumping rates at the wellbore, the reduced cross-sectional area 'artificially' increases the velocity of the second or successive proppant stages through that section of the fracture, leading to improved transport and deeper placement of the second or successive proppant stages into the fracture than would be achieved within the created fracture in the absence of the proppant bank." U.S. Pat. No. 7,210,528 describes a method of using ultra lightweight (ULW) proppants to provide an increase in effective propped lengths. Using ULW proppants, proppants move further away from the borehole. Blockages near the borehole are reduced. Later stages of stimulation get farther into the formation and are more effective.

U.S. Pat. No. 7,341,103 describes servicing fluids comprised of gelled liquefied petroleum gas or servicing fluids comprised of a conventional gelled hydrocarbon fluid with liquefied petroleum gas and methods of using such servicing fluids in subterranean formations.

"[T]he use of conventional water-based servicing fluids in subterranean operations may present disadvantages. For instance, the high capillary pressures associated with the use of an aqueous system may restrict the flow of produced gaseous hydrocarbons such as methane. Capillary pressures of several thousand psi (pounds per square inch) may result in low permeability formations, wherein the high pressure differential needed to initiate gas flow may result in extended fluid recovery times, or permanent loss of effective fracture half length. Furthermore, the use of water in under-saturated reservoirs also may reduce permeability and associated gas flow through a permanent increase in the water saturation of the reservoir.

The use of a carbon dioxide miscible hydrocarbon servicing fluid may overcome these limitations through achievement of a miscible drive mechanism where produced methane is used to displace the hydrocarbon fracturing fluid from the formation. To facilitate this process, more volatile hydrocarbon blends may be used in place of traditional hydrocarbon servicing fluids such as diesel fuel. For example, carbon dioxide may be added to the hydrocarbon-based servicing fluids, inter alia, to increase the efficiency by which methane can displace it and provide increased energy for fluid recovery and thus its rate of recovery from the subterranean formation. However, increasing concentrations of dissolved carbon dioxide in the liquid hydrocarbon make it progressively more difficult to gel with phosphate ester and alkylphosphonic acid ester gel systems. As a result, there is a limit to the concentration of carbon dioxide that may be present in such servicing fluids. For instance, if too high a concentration of carbon dioxide is present, the servicing fluid may not have a viscosity sufficient to carry the needed quantity of particulates to a desired location within a wellbore, to adequately control fluid leak off, and to generate the desired fracture geometry."

Therefore, the selections of the servicing fluids have an impact on the production of hydrocarbons.

Hydraulic Fracturing Using Solution that Reacts in Formation to Create Distal Fractures The force required to fracture a porous media can be exerted by fluid pressure. Normally, the pressure is applied at the surface with the use of mechanical pumps. Fluid is pumped down the wellbore into the formation. The highest pressure is at the discharge end of the pump and the pressure drops off as the distance from the pump is increased. At the fringe of the fluid movement, the pressure difference with the original formation fluids is minimal. Having a chemical reaction produce a pressure greater than the formation breakdown pressure will create new and enlarged fractures, which will improve permeability of the formation further away from the wellbore.

U.S. Pat. No. 3,896,879 describes methods using stabilized hydrogen peroxide solutions being injected into the subsurface. When solutions come into contact with metal values in the formation, the hydrogen peroxide then undergoes rapid decomposition to form a gaseous medium which has a pressure greater than the formation breakdown pressure. Consequently, additional fractures are created as well as the enlargement of the present fractures.

U.S. Pat. No. 4,590,997 describes a "method for extending fractures in underground formations obtained by controlled pulse fracturing through the use of a stabilized hydrogen peroxide solution. Controlled pulse fracturing causes radial fracturing near the wellbore. These radial fractures are further extended into the formation or reservoir when stabilized hydrogen peroxide is forced into the radial fractures. Stabilizing agents in the hydrogen peroxide react with metals mixed with a proppant in the formation causing the hydrogen peroxide to breakdown and form gas pressure sufficient to extend the radial fractures. Hydrocarbonaceous fluids are then obtained from the natural fractures in said formation via the extended fractures which contact natural fractures emanating from the wellbore." These methods illustrate the benefits of pulse fracturing along with the pressure generated by in-situ triggering of reactions at distal locations to extend the radial fractures. However, these methods do not discriminate between the water flowing networks or the hydrocarbon flowing networks. In most situations, these methods would work on the water flowing networks as opposed to the preferred hydrocarbon flowing networks. The production of $O_2$ could also lead to problems in many reservoirs by establishing aerobic biological conditions.

U.S. Pat. No. 4,848,468 describes a method "for extending a vertical fracture formed in a formation having original in-situ stresses that favor the propagation of a horizontal fracture. In this method, a subsurface formation having original in-situ stresses that favor the propagation of a horizontal fracture is penetrated by a cased borehole which is perforated at a pair of spaced-apart intervals to form separate pairs of perforations. Fracturing fluid is initially pumped down said cased borehole and out one of said sets of perforations to form the originally favored horizontal fracture. The propagation of this horizontal fracture changes the in-situ stresses so as to favor the propagation of a vertical fracture. Said horizontal fracture is extended by placing a chemical blowing agent and surfactant into the fracturing fluid. Gas released by decomposition of said agent causes foam to be generated along with an increase in pressure thereby extending the horizontal fracture. Thereafter, while maintaining pressure on said horizontal fracture, fracturing fluid is pumped down said cased borehole and out of the other of said sets of perforations to form the newly favored vertical fracture." This patent document describes that the temperature triggered chemical blowing agent decomposes and creates foam and pressure which extends the propagated fracture to a substantially greater distance, producing better fractures. Having the chemical reaction produce gas and pressure distal to the wellbore is beneficial. Although this method focuses on changing the orientation of the fracture, it does not address how to prevent preferentially fracturing the water flowing networks.

Clearly, there is a need to generate fractures to increase the ability of the preferred fluid to flow to the well.

Hydraulic Fracturing and Modifying Water-Bearing Zones

Water production is a significant problem in maximizing hydrocarbon recovery. Besides reducing the amount of hydrocarbon recovery, there are tremendous costs and environmental impacts. Separation and disposal of produced water requires a substantial effort. Inhibiting the corrosion of equipment is a challenge and creates environmental impacts. Mitigations of water issues are significant so that land and water are not contaminated.

U.S. Pat. No. 2,881,837 describes a method to fracture the oil or gas bearing formation and prop open the fractures, without permanently propping open fractures which may be flowing water or brine by using a proppant that is water soluble and insoluble in the fracturing liquid. As the fractures close because of dissolution of the water soluble proppant, there are no further reactions since the method defines salts that are highly soluble in water.

U.S. Pat. No. 5,322,121 describes "a fracturing fluid comprised of: (a) a carrier; (b) a nucleating agent capable of reducing the concentration of scale-forming ingredients and/or natural occurring radioactive materials (NORMs) present in an aqueous subterranean fluid; and optionally, (c) an ingredient selected from the group consisting of proppants, friction-reducing additives, fluid-loss-control additives, gelling agents, bactericides, and scale stabilizers. The fracturing fluid is employed in hydraulic fracturing procedures to, among other things, reduce the concentration of the scale-forming ingredients and/or NORMs present in produced aqueous subterranean fluids." U.S. Pat. No. 5,322,121 illustrates reducing the concentrations of certain compounds that are dissolved in the water phase by conditioning the fractures with agents that can preferentially react with unwanted dissolved constituents in the water phase.

U.S. Pat. No. 5,979,557 describes a method of limiting the inflow of formation water during and after a well turn around to maximize polymer recovery after a hydraulic fracturing treatment of a formation having a hydrocarbon zone and a water-bearing zone. The method is comprised of: a step for selectively blocking the pore structure in the water-bearing zone at the formation face and not blocking the pore structure of the hydrocarbon zone at the formation face; performing a hydraulic fracturing treatment using a fluid having a polymer; and turning the well around to recover the polymer.

"In the recovery of hydrocarbons from subterranean formations, particularly in such formations wherein the wellbore also traverses water-bearing zones, the desire is to facilitate the movement of hydrocarbons to the wellbore so that the hydrocarbons may be pumped from the well. At the same time, there is a corresponding desire to limit the movement of formation water into the wellbore and production thereof. In order to enhance the effectiveness of some of these methods for increasing (or stimulating) hydrocarbon production, the proper placement of stimulation fluids, for example, acidizing and/or fracturing fluids, at the hydrocarbon zones and minimizing the loss thereof into the water zones is desirable.

Acidizing is used to stimulate hydrocarbon production from a well. There are two types of acidizing treatments: (1) matrix acidizing and (2) fracture acidizing with the difference between them relating to injection rates and pressures. Fracture acidizing is acidizing at injection rates above fracture pressure. Fracture acidizing is used for creating cracks or fractures in the formation to increase the available flow area and thereby increase well productivity. Acidizing at injection rates below fracture pressure is termed matrix acidizing. Matrix acidizing is primarily used for damage removal and to restore the permeability to original reservoir permeability or higher. The damage is primarily skin damage caused by drilling, completion and workover fluids and precipitation of deposits from produced water or oil (such as scale). Removal of severe plugging in carbonate and sandstone formations can result in very large increases in well productivity. Oil well flow behavior is greatly affected by the geometry of radial flow into the wellbore. The pressure gradient, for example, psi per foot, is proportional to the flow velocity and is very small at large distances from the wellbore. At points close to the wellbore, the flow area is much smaller and the flowing pressure gradient is much higher. Because of this small flow area, any damage to the formation close to the wellbore, say within 20 feet thereof and sometimes within as little as 3 feet therefrom, may be the cause most of the total pressure draw down during production and thereby dominate well performance. Since the acidizing fluids do not discriminate between hydrocarbon and water bearing zones, an undesired result may be obtained wherein the production of formation water is increased. Thus, there is a need to direct acidizing fluids away from water bearing zones and preferably also limit the amount of formation water produced once the well is turn around."

The importance of not stimulating water bearing zones is critical during the later stages of production as well as at the beginning of the stimulation activities.

U.S. Pat. No. 7,458,424 states that "[i]n the described method of using the gelling system, the gelling system may be pumped into formations with excessive water and/or gas production and thermally activated in the formation at downhole conditions to form a hard gel to reduce water and/or gas production." This is an example of a chemical reaction that reacts with water and is activated by the elevated temperatures at depth.

U.S. Pat. No. 7,533,723 describes a treatment fluid and methods for selectively reducing the outflow of water during recovery of hydrocarbons. Additionally, the principle of forming a precipitate that is substantially soluble in hydrocarbons and substantially insoluble in water is described.

U.S. Pat. No. 7,588,081 "provides a method of treating a subterranean formation penetrated by at least one injection well and at least one production well, the method comprising the steps of: a) analyzing the injection well, the production well, and reservoir contained in the subterranean formation; b) selecting at least one fluid and at least one permeability reducer to be placed in flow ways contained within the formation; and c) performing a formation permeability modification using the selected fluids and at least one permeability reducer, whereby the flow of injected driving fluid between the injection well and production well is substantially reduced."

The methods of reducing water flow are useful. However, intervention earlier and further out in the formation is desired. Water flowing networks should be shut down sooner, so that less of the formation changed from hydrocarbon saturated to water saturated. Once a hydrocarbon flowing network has switched over to water flowing, a new set of cracks and fractures should be generated to connect up hydrocarbon zones that may have been stranded.

There remains a great need to have a method dynamically adjust to the evolving subsurface flow system that can adapt and shut off water flow and initiate hydrocarbon flow.

Using Chemical Reactions to Improve Hydrocarbon Flow

Removing restrictions in the flow system can dramatically increase hydrocarbon recovery. Methods can focus on improving the conditions in the piping and conduits. Removing blockage in the formation surrounding the wellbore also can significantly improve hydrocarbon recovery. Reducing blockage by the buildup of scale, paraffin, asphaltenes and other organic and inorganic solids is extremely beneficial. It is easier to identify and fix restrictions which are at the wellbore or in the proximal area.

U.S. Pat. No. 2,218,306 discusses treating oil wells by removing paraffinic, resinous, asphaltic or other organic or inorganic substances. First, a predetermined amount of water is added to the well. Then, an alloy of an alkali metal is placed in the water of that well. The amount of the alloy is sufficient to produce in excess of four percent alkali hydroxide solution. Before the solution cools, the liquid is removed from the well before it solidifies.

U.S. Pat. No. 2,672,201 discusses introduction of finely divided alkali metal particles coated in a decomposable material. The reaction of the metal is triggered by a temperature above 150° F. The caustic solution produced is used to dissolve the silica minerals at elevated temperatures. The use of the materials is used at the injection well and the oil is recovered at the production well. Coating the material and keeping formations at elevated temperatures is expensive and difficult. Dealing with the caustic solution that dissolved the silica minerals has negative ramifications, both economic and environmental.

U.S. Pat. No. 2,799,342 discusses treating a well with a dispersion of alkali metals in a liquid wax solvent. The reaction of the alkali metal with the water contained in the formation raises the temperature. The solvent carrier and the reaction products are removed at the elevated temperature. The purpose of this treatment is to free the various substances, deposits of waxes, paraffins, bitumens, asphalts and miscellaneous resins in and near the wellbore.

U.S. Pat. No. 2,872,982 discusses treating oil wells with an alkali metal borohydride. The method introduces a solution of alkali metal borohydride into a well until the amount of solution is sufficient to contact the surrounding oil-bearing formation. An acid is added to react with the alkali metal borohydride in the well. The reaction generates a substantial volume of hydrogen, which imposes substantial pressure upon the fluid. The solution penetrates and impregnates the pores of the formation. Adding more acid to react with the metal borohydride in the pores generates hydrogen, which then loosens and forcibly removes the substances from the pores that were creating the clogs.

U.S. Pat. No. 2,889,884 uses metal hydride solution to consume water and scavenge plugging material from the formation. Hydrocarbons can invade those empty networks once the water is removed.

U.S. Pat. No. 3,386,511's objectives are to increase porosity and to heat the formation for the purpose of reducing the viscosity of the oil. These methods do heat the formation, but the changes in the subsurface are only effective close to the wellbore.

U.S. Pat. No. 4,448,253 describes a method for removing a productivity-impairing water-block. The water-block is removed from a subterranean reservoir by injecting an aqueous alkaline solution containing both an alkali metal borohydride and an acid-yielding reactant that is relatively slowly reactive. U.S. Pat. No. 4,448,253 states that it is a "well treating process for removing water from a subterranean reservoir without fracturing the reservoir or necessarily disturbing any fluid-displaceable particles within the well or reservoir." By decreasing the water that had filled the pores of rocks, hydrocarbon fluids can then flow. This method is limited to conditions where the hydrocarbon liquid will invade those "cleaned out" pores quicker than the surrounding water. It is likely that this method would have to be reapplied to provide for a longer term remedy to water blocking hydrocarbon flow.

U.S. Pat. No. 6,444,316 "provides methods of encapsulating chemicals for use in controlled time release applications, encapsulated water soluble chemicals and methods of using the encapsulated chemicals which meet the above described needs and overcome the deficiencies of the prior art. The methods of this invention for encapsulating water soluble particulate solid chemicals basically comprise the following steps: a first coating is formed on the particulate solid chemical which is a dry hydrophobic film forming material or a dry sparingly soluble material. The hydrophobic material or the sparingly soluble material is present in the first coating in an amount such that it provides a dry shield on the encapsulated chemical and preferably provides a short delay in the release of the encapsulated chemical in the presence of water. A second coating is next formed on the first coating which is a porous cross-linked hydrophilic polymer. The porous hydrophilic polymer is present in the second coating in an amount such that when contacted with water it prevents the substantial dissolution of the encapsulated chemical for a selected time period." This patent document illustrates the importance of having a controlled time release of chemicals for use in hydrocarbon recovery.

U.S. Pat. No. 7,624,743 describes "methods for increasing the temperature of a section of conduit used for the production or transmission of hydrocarbons. According to one aspect, the method includes the steps of: (a) forming a treatment fluid comprising; (i) a carrier fluid; and (ii) a first reactant and a second reactant; and (b) introducing the treatment fluid into a section of conduit used for the production or transmission of hydrocarbons. The first reactant and second reactant are selected for being capable of reacting together in an exothermic chemical reaction; and the first and second reactant are in at least sufficient concentrations in the carrier fluid to generate a theoretical heat of reaction of at least 1,000 kJ/liter of the treatment fluid. At least some of at least one of the first reactant and the second reactant is suspended in the carrier fluid in a solid form that is adapted to help control the release of the reactant into the carrier fluid."

These methods do not benefit from the chemical reactions being triggered out in the formation as hydrocarbon channels become water flow-path channels. Nor do these methods describe how to get the chemical reactions' byproducts to help change the environment to stimulate biogenic methane production.

Stimulation of Methane Generation by Microbial Activity

Increasing the rate of methane generation is accomplished by optimizing conditions of the subsurface. Adding organisms, enzymes, nutrients, substrate or the changing of the chemical and/or physical character of the subsurface, stimulates methane generation. Temperature, pH, dissolved organic compounds and $H_2$ concentrations significantly influence the amount of methane generated. Naphthenic acids and other organic acids are major components of dissolved organic compounds in formation waters.

Holowenko, et al., 2001, supplemented microcosms with $H_2$ and found major effects on methane generation. "Many microorganisms not only consume $H_2$ as an energy source, they also produce $H_2$ in their metabolism (Zehnder and Stumm, 1988). In anaerobic ecosystems, $H_2$ has even been referred to as the universal currency that connects populations with distinct physiologies in anaerobic food webs (Wolin, 1982; Wolin and Miller, 1982)." (Löffler et al., 2005).

As stated by Dolfing, et al., 2007, "[t]he significance of methanogenic crude oil degradation in petroleum reservoirs goes beyond its potential role in the biodegradation of petroleum reservoirs; it may ultimately be crucial for processes that can enhance the recovery of residual oil. Typically, over 60% of the oil in place in a petroleum reservoir remains unextractable following standard production procedures and the possibility that methanogenic degradation of this residual oil can re-pressurize a petroleum reservoir, has some potential for enhancing oil recovery. Furthermore, the volumetrics of gas recovery are far better than for oil (typically 70% of gas in place can be recovered) and methanogenic conversion of non-recoverable residual hydrocarbons to recoverable gas may be an economically viable way of extending the operational life of petroleum reservoirs (Parkes, 1999; Larter et al., 1999; Head et al., 2003)." Dolfing, et al., 2007)

Winfrey, et al., 1977, demonstrated the importance of hydrogen gas for methanogenesis. They noted that "methanogens keep the partial pressure of hydrogen extremely low and thus allow otherwise thermodynamically unfavorable reactions to occur."

The breakdown and transfer of hydrocarbons to a location where active microbial activity is initiated is critical for biogenic gas generation. Sustaining a consortium of bacteria that establishes a preferred food chain is initiated at the lowest trophic levels.

U.S. Pat. No. 6,543,535 describes a method to stimulate the activity of microbial consortia in a subterranean formation to convert hydrocarbons to methane. Data is collected and then the information is used as the basis for modifying the formation environment to produce methane.

U.S. Pat. No. 7,640,978 describes methods for stimulating biogenic methane production from a carbonaceous substrate. By contacting the carbonaceous material with a methanogenic consortium, generation of methane occurs.

U.S. Pat. No. 7,977,056 describes methods of identifying stimulants for the biogenic production of methane in hydrocarbon-bearing formations. Enzymes and stimulants identified by invention methods are used in these processes for enhancing biogenic methane production.

U.S. Pat. App. 20040033557 describes creating subsurface fractures in a deposit of coal, carbonaceous shale or organic-rich shale. Then, various modifications are injected, including a consortium of selected anaerobic biological microorganisms, nutrients, carbon dioxide and other substrates. These injections convert organic compounds into methane.

As stated in U.S. Pat. No. 7,640,978, "[n]ew techniques are also needed for stimulating microorganisms to produce more biogenic gases. Native consortia of hydrocarbon consuming microorganisms usually include many different species that can employ many different metabolic pathways. If the environment of a consortium is changed in the right way, it may be possible to change the relative populations of the consortium members to favor more combustible gas production. It may also be possible to influence the preferred metabolic pathways of the consortium members to favor combustible gases as the metabolic end products. Thus, there is also a need for processes that can change a formation environment to stimulate a consortium of microorganisms to produce more combustible biogenic gases."

Changing the Properties of Hydrocarbon Fluid

Various methods can change hydrocarbon fluid properties to improve recovery. Flow can be improved by chemical additions, increasing gas concentrations and microbial actions. Alkaline or caustic solutions react with oil to produce soap that lowers the interfacial tension. Oil swelling and viscosity reduction is accomplished by introducing gas to the hydrocarbon liquid. Increasing the temperature of the hydrocarbon reduces its viscosity. Microbial activity partially digests long hydrocarbon molecules. Microbes also generate bio-surfactants, carbon dioxide and methane, all of which change flow characteristics of the hydrocarbon fluids.

U.S. Pat. No. 3,386,511's objectives are to increase porosity and to heat the formation for the purpose of reducing the viscosity of the oil. The methods use heat to raise the temperature of the formation, but the changes of the subsurface are only effective close to the wellbore.

U.S. Pat. No. 4,007,791 "comprises thinning the crude oil in the formation by introducing into the oil well a thinning fluid, such as a solvent or mixture of solvents that will flow into the formation and thin the oil in the formation sufficiently so that it will flow into the well. A further step is heating the solvent either before the solvent is introduced into the well or after it is in the well and pressurizing the well to increase the penetration of the solvent into the formation. One method of heating the solvent in the well is to introduce water into the well, allow the solvent to rise to the surface of the water and introduce sodium into the well to cause a reaction with the water for producing heat and pressure. Heating the solvent increases its thinning action on the crude oil."

U.S. Pat. No. 4,085,799 discusses recovering oil by using an injection well to drive the oil to a production well. At the injection well, a mixture of organic liquid and particles of alkali metals are injected. The particles must be smaller than the size of flow channels. At the injection well, water is injected to displace and react with the mixture of organic liquid and particles of alkali metals. The production well is used to recover the oil displaced by the fluids used at the injection well.

U.S. Pat. No. 4,634,540 describes "mixing controlled quantities of alkali metal hydroxide and silicon in an aqueous medium to produce an oil modification agent. When recovering hydrocarbons, the composition can be injected into a hydrocarbon-bearing formation to react with and/or thin the entrapped hydrocarbons within the formation. The composition also provides a dispersing agent which aids in release of the hydrocarbon from its entrapment and enhances recovery from the formation." This method works best near the well. Its effectiveness decreases as distance away from the well increases.

U.S. Pat. No. 7,581,594 describes "[a]method to enhance oil recovery from a fractured carbonate reservoir, the reservoir being accessible via a production well, the method comprising: injecting a surfactant solution comprising surfactants into the production well, the surfactant solution selected to increase an oil-to-water ratio of oil recovery from a porous matrix portion of the reservoir; and injecting a well-servicing volumetric solution into the production well to perform a second well treatment process; and wherein: the second well treatment process is selected from the group consisting of a scale inhibition squeeze process, a well acidizing process, a chemical process to reduce water production rate, an acid fracturing process, and a hydraulic fracturing process; and the surfactant solution and the second well treatment solution are injected into the production well within less than about six months of one another." Combining surfactant treatment with secondary oil well treatments is discussed. This method is limited to having solutions injected into the subsurface and does not dynamically change the subsurface conditions. The use of a chemical reaction to generate heat, pressure, gases and modifying agents in-situ deep in the formation is not accounted for.

U.S. Pat. No. 7,798,221 describes methods applying heat into the formation to raise the temperature at a selected rate for the pyrolysis of hydrocarbons within the formation. A mixture of hydrocarbons and $H_2$ may be produced from the formation. The condensable hydrocarbons removed from the formation may be high quality oil that has relatively low olefin content and a relatively high API gravity. Changes of temperature can impact the chemical composition of both liquids and solid containing organic carbon compounds.

U.S. Pat. No. 7,946,342 describes methods for oil recovery, preferably medium or heavy oil, comprising creating one or more oil wells in the earth, preferably at a depth greater than 2,000 feet. An exothermic water reactant (EWR) encapsulated in a water soluble coating is positioned in one or more oil wells with water. After the water soluble coating of the EWR dissolves, the EWR and water react to preferably produce heat, an alkali solution, and hydrogen gas. "The heat from the EWR reaction generates steam, which is forced into the oil bearing formation where it condenses and transfers heat to the oil, elevating its temperature and decreasing the viscosity of the oil. The aqueous alkali solution mixes with the oil in the oil bearing formation and forms a surfactant that reduces the interfacial tension between the oil and water. The hydrogen may be used to react with the oil at these elevated temperatures to form lighter molecules, thus upgrading to a certain extent the oil in situ. As a result, the oil can flow more efficiently and easily through the oil bearing formation towards and into one or more production wells." The method focuses on the reactions in the wellbore and relies on the fluid, temperature and energy transmission into the formation. The utilization of the byproducts of the reactions deeper into the formation is less efficient and effective due to the location of the reactions.

There are disadvantages, both economic and environmental, with respect to current methodologies. Current processes fail to generate the greatest recovery of hydrocarbons (and thereby optimize economic return) from the fracturing process due to the fact that current chemicals/processes only create pressure and fractures near the wellbore, and less so farther away from the wellbore. This failure results in the abandonment of hydrocarbons outside the reach of the current fracture length.

Current practices also do not preferentially connect oil ganglions. There is no procedure for an agent to react farther away from the well, or to create a domino effect by continuing to create new fractures farther away from the wellbore. Instead, current procedures either smash (with pressure or explosives) or melt (with acid) rock formations without preferentially creating the connection of oil ganglions and improving fluid properties. Instead, currently, water-bearing networks, along with oil- and gas-networks, are all indiscriminately opened and propped, which necessarily increases the flow of water into the wellbore.

Further advances are needed to effectively recover hydrocarbons with improvements in environmental stewardship.

BRIEF SUMMARY OF THE INVENTION

Technical Problem

This invention overcomes limitations for recovering resources.

Despite improvements in the technology, overriding concerns remain constant: how to recover the largest percentage of original hydrocarbons in place, how to reverse declining oil production in mature wells, how to extend the radial length of fractures, how to minimize water production and costs of its treatment/disposal, and how to decrease well density in a given field. Related concerns are how to optimize infrastructure costs, retrofit reservoirs for $CO_2$ sequestration, and how to enhance microbial methane production.

Solution to Problem

The method extends and enhances the length of hydraulic fractures, preferentially connects targeted fluid ganglions while concurrently inhibiting the production of unwanted water, and creates a more complete resource utilization cycle with less attendant pollution production and disposal costs. One embodiment of the invention generates methane from exhausted production areas.

Some of the objectives are:
Increase resource recovery by a confluence of the following:
  Creating fractures that connect up hydrocarbon flowing networks initially and dynamic response to changes in fluid composition of pore network
  As the production of hydrocarbon progresses, dynamically blocking off fractures or flow networks of unwanted water
  Opening up restrictions to hydrocarbon flow by removing paraffin, asphaltene and other inorganic and organic compounds
  Making surface tension and viscosity better to connect up bodies of hydrocarbons to better flow to the well
  Making portions of hydrocarbon more water soluble for improved rates of $CH_4$ generation
  Stimulating biogenic $CH_4$ with $H_2$ gas addition
  Establishing a new network that facilitates the micro accumulation of gas to migrate to location of accumulation where economic recovery of natural gases later occurs One general description of a solution comprises the following steps:
a) creating one or more wells;
b) analyzing one or more components of the formation to determine characteristics of the formation, the fluids and the biogeochemical environment;
c) selecting a combination of reagents and carrier fluids that will be able to be placed deep into the formation and whose reactions will be initiated at the proper time under the proper circumstances for at least one of the iterations;
d) using information obtained from steps b) and c) for determining how to stage the delivery of carrier fluid and reagents into the formation;
e) delivering the carrier fluids and reagents deep into the formation or enhancing the system for carrier fluid and reagent placement;
f) analyzing the data collected to date;
g) repeating steps c) through f) as appropriate;
h) recovering resource using one or more wells.

BRIEF DESCRIPTION OF THE DRAWINGS

FIG. 6 is a flowchart of another embodiment illustrating the use of a combination of calcium, Ca, with diesel and calcium oxide, CaO, with water.

DETAILED DESCRIPTION OF THE INVENTION

Figure 1:
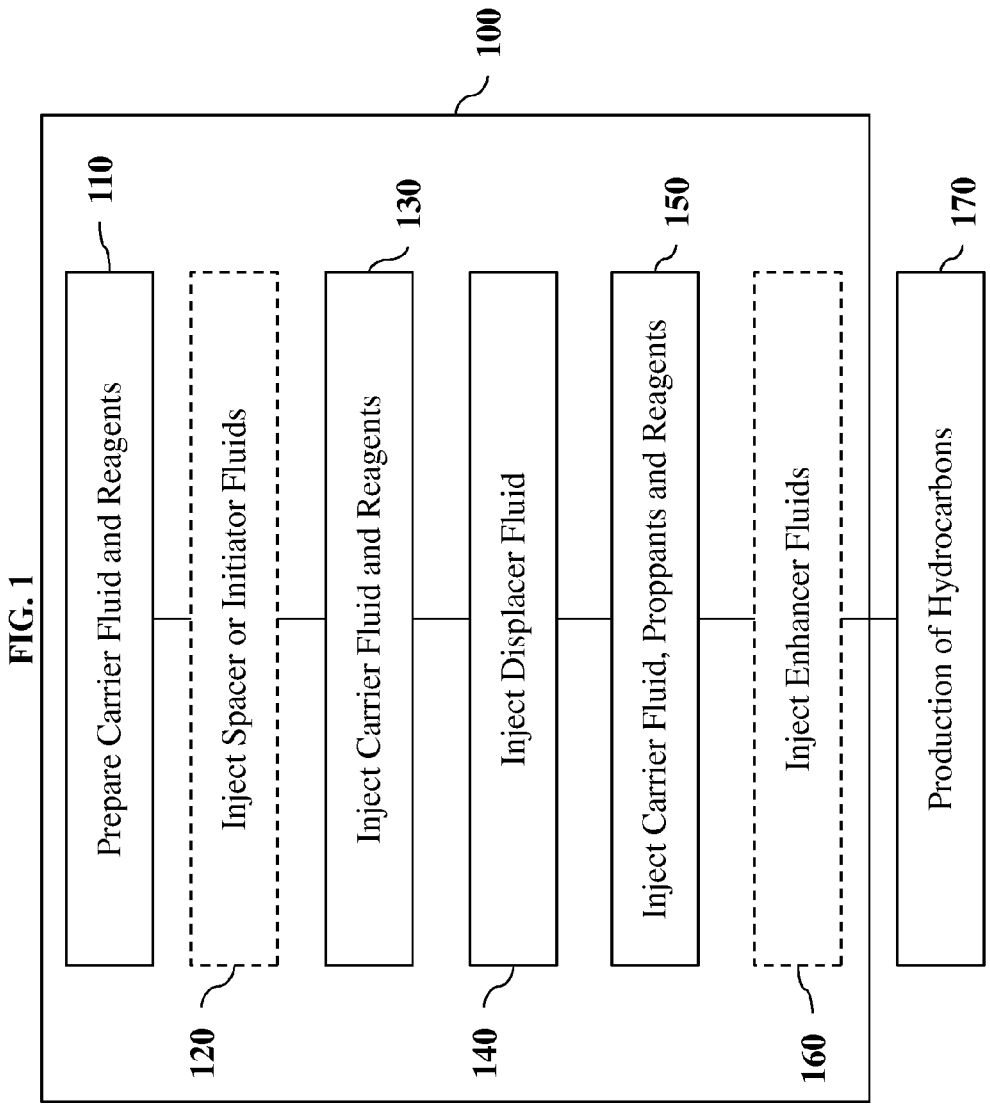
FIG. 1 is a block diagram of the steps in one embodiment.

This method improves recovery of resources from subterranean formations. The method extends and enhances the length of hydraulic fractures, preferentially connects oil ganglions while concurrently inhibiting the production of water, and creates a more complete resource utilization cycle with less attendant pollution production and disposal costs. The method also generates biogenic methane by use of the procedures described.

In general, hydrocarbon flow is easiest at a well's earliest stages. Subsequently, conventional and unconventional resources require varying amounts of stimulation to remain productive or economically viable. The methods described stimulate wells for better hydrocarbon production, and in addition, specifically address production decline, the need for enhanced oil recovery, EOR, and the re-use and recycling of the asset for improved environmental stewardship.

Certain elements and compounds react with an aqueous phase in an energy releasing reaction. The reactions of a reagent and water create a number of factors which together increase the preferential flow of hydrocarbon fluids to the wellbore. Among these factors are the production of hydrogen gas; heat and pressure changes due to conversion of a solid to a gas; the production of alkaline compounds blocking water flow; and improved viscosity of hydrocarbon fluids since some alkaline products change oil viscosity. Using these reagents allows the hydrocarbon stringers to form better connections while significantly reducing the flow of water to the wellbore. Blocking the water from the wellbore increases the pressure exerted on the hydrocarbon connections, which improves the sweep and therefore improves the efficiency of the hydrocarbon recovery.

Introduction of reagents into the subterranean formation prepares the asset. Original reactions of reagents are one of the processes for the initial stimulation. As the time of production matures, some of the channels where hydrocarbons were flowing get displaced by water. This interruption of the hydrocarbon stringers decreases flow of hydrocarbons to the well and increases water flow. The reactions of the reagents mitigate this undesirable condition by cracking the surrounding area. The physical forces of the reaction increase the connection of the surrounding fluids. The products of the reaction increase the ability of the surrounding fluids to flow. Under some embodiments, the hydrocarbons become modified to flow easier. The water reacts with the products to form a solid precipitant that restricts the networks where water is flowing.

For those fields that have an enhanced oil recovery stage, EOR, the reactions of the unreacted reagents again improve recovery. Just as EOR recovers residual hydrocarbons, the residual reagents will assist in pushing out the last drops of economically-viable hydrocarbons. EOR methods can be tuned for the next phase of the asset, which is the creation of methane.

Some fields will not go through the EOR stage. Regardless of the preceding stages of asset management, the products of the reagents are the building blocks used for microbial generation of methane. Carbon dioxide reduction is the reaction of carbon dioxide and hydrogen gas. There are microbial consortiums that convert hydrocarbons to smaller chained hydrocarbons, methane and hydrogen. The production of hydrogen gas by the reactions of the reagents stimulates and maintains increased methane generation by carbon dioxide reduction. The benefits of establishing this asset's next phase not only provides another source of the clean fuel, methane, but establishes another opportunity to sequester more carbon dioxide to minimize climate change.

EXAMPLE 1

The block diagram of FIG. 1 illustrates the steps taken to effectively and efficiently recover hydrocarbons from the subsurface using one embodiment, 100. The first step, 110, is at the surface, where a carrier fluid is prepared and the proper amounts of reagents are blended in the carrier fluid.

The reagents have some of the following attributes: a) reactive with water or a water-based solution; b) produce pressure by either a change in phase and/or the density of the solids produced are less than the density of the reagents, which in turn creates excess pressure; c) produce hydrogen gas; d) produce a water soluble anion that will selectively precipitate solids from interaction with water; e) form a solution that decreases interfacial tension of hydrocarbons which makes hydrocarbons more flowable; f) generate heat and raise both the surrounding fluids and solids temperature; and g) combinations of the above.

The reagents are preferably comprised of one or more alkali metals, alkaline earth metals, alkali metal hydrides, alkaline earth metal hydrides, metal hydrides, complex hydrides of alkali metals and aluminum, complex hydrides of alkaline earth metal and aluminum, complex hydrides of alkali metal and lithium, hydrides of alkaline metal and lithium, hydrides of alkali metal and boron, hydrides of alkaline metal and boron, alkali metal oxide, alkaline earth metal oxide, alkali metal hydroxide, alkaline earth metal hydroxide, or a combination thereof.

The carrier fluid used will be selected from servicing fluids currently in use, and requires the additional following attribute: the carrier fluid cannot be reactive with the reagents, or, the reactivity with the reagents is able to be delayed until the appropriate time. Example carrier fluids are water, gelled water, hydrocarbon-in-water emulsions, water-in-hydrocarbon emulsions, gelled hydrocarbons, high viscosity hydrocarbon liquids, carbon dioxide foam, nitrogen foam, and mixtures thereof.

An example of a carrier fluid and reagent combination that has a delayed reaction is Magnesium (Mg) and water. Mg does not react with cold water but does react with hot water. The water is cold at the surface of the earth and heats up once at equilibrium at the subsurface depth. The chemicals would react once the water temperature is elevated in the subterranean formation.

In step 130, the carrier fluid containing the reagents is then injected into the wellbore either directly or through a suitable conveyance tool, such as coiled tubing. The pressures and rates used in step 130 to inject the carrier fluids and reagents are set to widen and extend the fractures away from the wellbore hole. Injection of the carrier fluids and reagents is continued for a period of time to ensure that the reagents penetrate the boundary of the newly created fractures and cracks.

In step 140, a displacer fluid is formulated, made and injected into the wellbore. This displacer fluid will move the carrier and reagent used in step 130 deeper into the formation. The displacer fluid needs to be non-reactive with the reagents and capable of purging the newly formed fractures and cracks of the previously injected reagents. Incomplete displacement is acceptable.

In step 150, a mixture of carrier fluid, proppants and reagents is formulated, made and injected into the bore hole. The carrier fluid and proppants need to be non-reactive with the reagents. Also, this mixture is capable of distributing the proppants and reagents throughout the widened and extended fracture.

An optional step included in FIG. 1 is step 120, in which spacer or initiator fluids are injected to preferentially initiate the fracture. As is known to those skilled in the art, selecting a preferred orientation, width or other attribute of the fracturing network is accomplished by incorporating geological, petrophysical and engineering principles.

Another optional step is depicted in step 160, which describes the injection of an enhancer fluid. Enhancer fluid can facilitate cleanup of previous fluids used for fracturing. Or, it can be used as an activating fluid for changing the physical or chemical properties of the subsurface fluids, which will enhance and improve the preferred activation of the reagents placed in the subsurface.

After the application of this method, step 170 begins. The pressure in the wellbore is lowered to backflow and the recovery of hydrocarbons begins.

EXAMPLE 2

Figure 2:
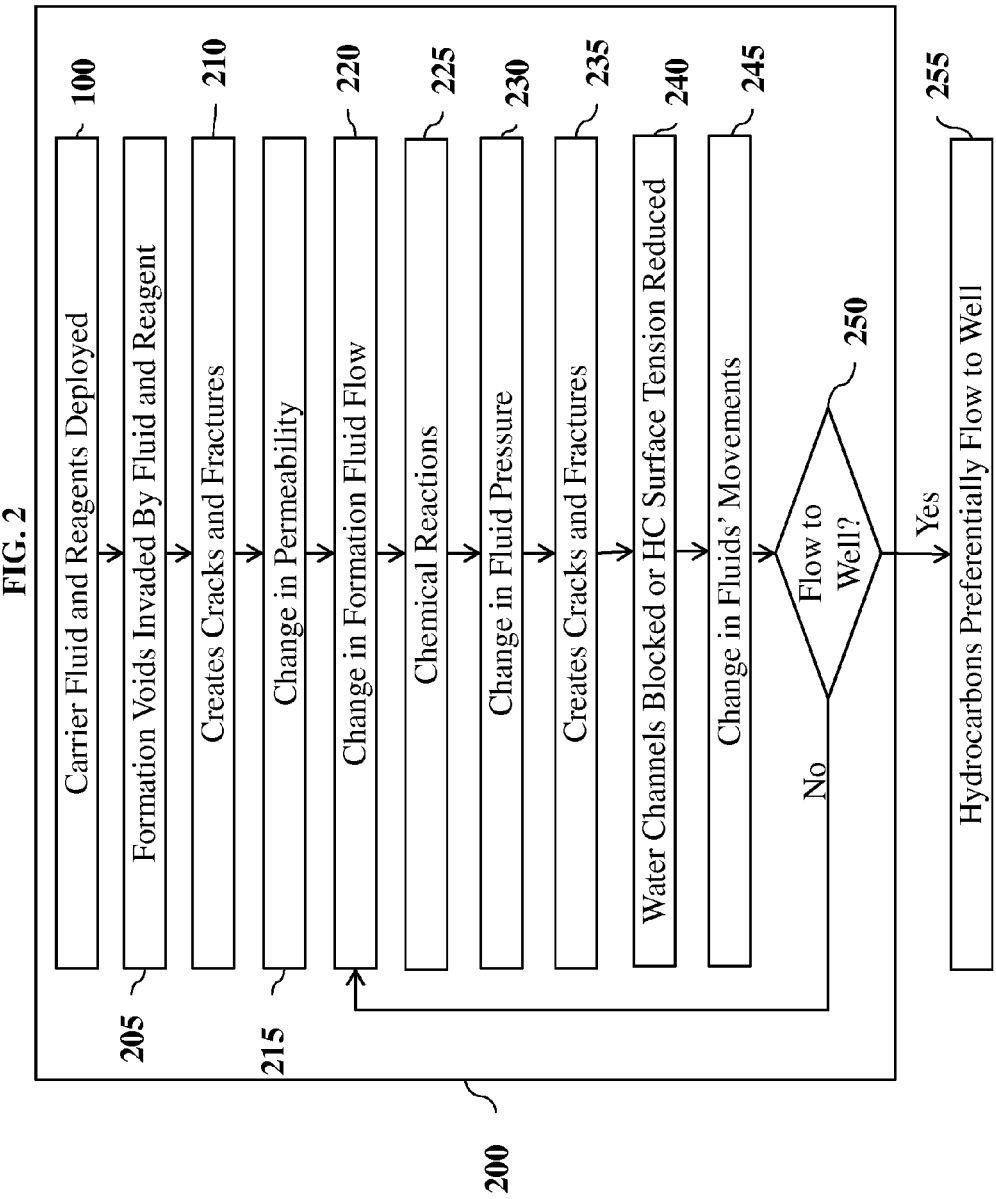
FIG. 2 is a flow chart of another embodiment illustrating the use of sodium (alkali metal) in liquefied petroleum gas.

FIG. 2 depicts the flow chart illustrating one embodiment of the present invention 200. Method 200 starts by applying the steps in 100, deploying carrier fluids and reagents into the subsurface in the proper sequencing, volumes, rates and pressures. One such combination uses sodium metal (Na) as the reagent in liquefied petroleum gas (LPG) as the carrier fluid. Sodium has a density at 25° C. of 0.968 g·cm-3 and at 97.72° C. (melting point) a liquid density of 0.927 g·cm-3. This example describes sodium used as a liquid, although at different pressures and temperatures, sodium might be a solid. In the instance of applying this technique at subterranean conditions above the melting point of sodium, the reagent is in solution with the carrier fluid. For the purpose of brevity, this description will be focused on liquid sodium metal as the reagent, although a multitude of other combinations or reagents and their phase, chemistry and physical attributes are as or more applicable given a set of conditions of the subterranean formation (permeability, capillarity, wettability, phase, composition, mineralogy, temperature, pressures etc.).

Step 205 is characterized by the voids of the formation being invaded by the carrier fluid and reagent. The fluids that were occupying that space are displaced and pushed away from the well. The distances of the invasion of the carrier fluid and reagents are controlled by the pressure field, which is strongly influenced by relative permeability and capillary forces. By changing the injection rates and pressures, along with the composition of the mixture, one skilled in the art can achieve optimal placement. Note that the steps in 100 are optimized for creating the most effective propped fractures and invasion into the adjoining subterranean formation to get the most beneficial hydrocarbon recovery rates and volumes for the economic life of the resource.

The pressures of the carrier fluid and reagents create cracks and fractures in step 210. The solid particles are displaced such that more void space is locally enlarged. The enlarged void space changes the permeability of the area, as depicted in step 215. Steps 205, 210 and 215 are active during 100 and continue for a period of time after steps 150 or 160. In some instances, steps 220, 225, 230, 235, 240, and 245 can occur during the preceding steps of 100, 205, 210, and 215. Those skilled in the art understand that this description is a simplification and that other operational parameters or subterranean conditions can lead to the steps being sequenced in a different order. For example, close to the well, step 225 and 230 could be occurring, while farther from the well, steps 205 and 210 could be occurring.

As the pressure of the subterranean formation begins to return to the initial pressures, changes occur. For this example, liquid petroleum gas (LPG) is used as the carrier fluid. The LPG begins to dissolve into the pre-existing hydrocarbon phase, and then the formation fluids begin to migrate. The change in the formation fluid has begun, as depicted in step 220. The fluids move toward areas of lower potential at the rate dictated by the petrophysical properties of the newly created zones of cracks and fractures, some of which are filled with proppants and reagents. Some of the fluids that were displaced by the carrier fluid and the reagents will reinvade those same voids. Some of the voids will have sodium filling parts of the conduits.

When the formation water comes into contact with the sodium, a chemical reaction occurs as depicted in step 225. The equations below describe the reactions:

Sodium+water→sodium hydroxide+hydrogen gas+ heat $$2Na(s)+2H_2O(l) \rightarrow 2NaOH(aq)+H_2(g)$$

where (s) means solid, l means liquid, (aq) means aqueous solution and (g) means gas.

This reaction generates heat and excess pressure due to density and phase changes (volume increases), 230. The increased localized pressure creates cracks and fractures by physically rearranging the solids, 235. These cracks and fractures connect up the surrounding flow networks in a new configuration. The production of the NaOH solution is not in equilibrium with the original formation fluids. The hydroxides react with both the hydrocarbon phases and water. With respect to the hydrocarbon phases, the hydroxide reduces interfacial tension, which increases recovery efficiency. With respect to the water, the solubility of the alkaline earth metal and alkali metal cations (which are dissolved in pre-existing formation waters) are such that a precipitant of solid oxy-hydroxide-carbonate complex will form, thereby selectively plugging flow networks where more water is present than hydrocarbons. The flow channels where the predominant fluid is water will be blocked, while the areas where hydrocarbons are present will have the interfacial tension reduced in that phase, 240.

The net result of steps 220, 225, 230, 235, and 240 modifies the flow networks such that the hydrocarbon phase is moving toward the pressure low at the wellbore, while the water (which is also trying to flow to the wellbore) generates blocks in the remaining water flowing network.

In step 245, fluid movement of the hydrocarbon phases and water is modified. Increases in the connectivity of the hydrocarbon phase network and modification of the interfacial tension of the hydrocarbon phase allows more efficient drainage, along with reduced water flow.

Step 250 illustrates a decision point where one of two actions occur. Either the hydrocarbons are preferentially produced at the wellbore, 255, or the cycle repeats: if the fluids are still in the subterranean formation, they continue to be involved in the steps beginning at step 220 and subsequent sequences.

EXAMPLE 3

Figure 3:
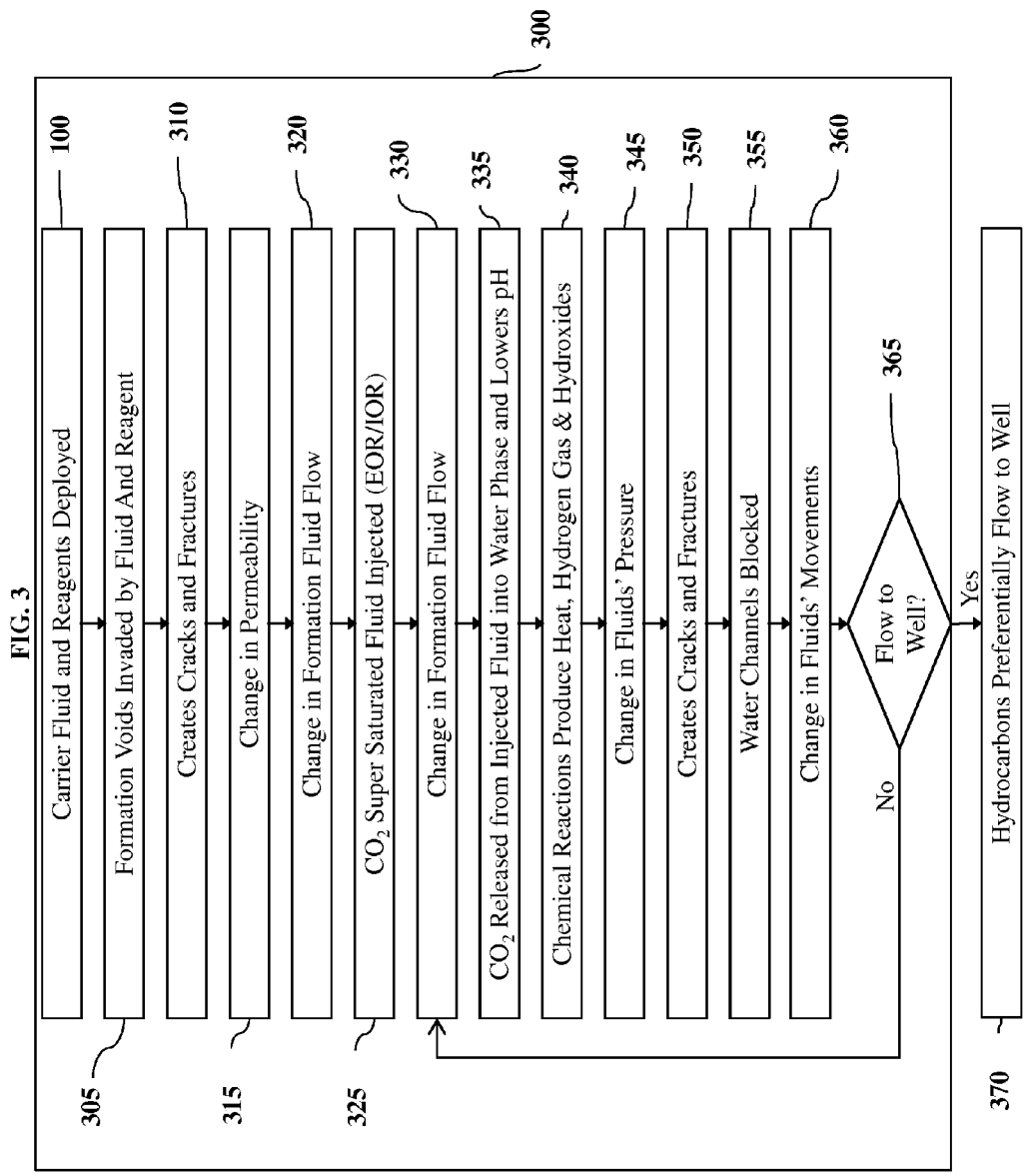
FIG. 3 is a flow chart of another embodiment illustrating the use of a combination magnesium (alkaline earth metal) and $CO_2$ injection.

FIG. 3 depicts the flow chart illustrating one embodiment of the present invention 300. Method 300 starts by applying the steps in 100, which is deploying carrier fluids and reagents into the subsurface in the proper sequencing, volumes, rates and pressures. One such combination uses the alkaline earth magnesium (Mg) as the reagent in a water based carrier fluid that is supersaturated with $CO_2$ gas. Magnesium has a density at 25° C. of 1.74 g·cm-3. The melting point of magnesium is 647° C. Magnesium is therefore a fairly lightweight solid. A multitude of other combinations or reagents and their phase, chemistry and physical attributes are as or more applicable given a set of conditions of the subterranean formation (permeability, capillarity, wettability, phase, composition, mineralogy, temperature, pressures etc.).

Step 305 is characterized by the voids of the formation being invaded by the carrier fluid and reagent. The fluids that were occupying that space are displaced and pushed away from the well. The distances of the invasion of the carrier fluid and reagents are controlled by the pressure field, which is strongly influenced by relative permeability and capillary forces. By changing the injection rates and pressures, along with the composition of the mixture, one skilled in the art can achieve optimal placement. Note that the steps in 100 are optimized for creating the most effective propped fractures and invasion into the adjoining subterranean formation to get the most beneficial hydrocarbon recovery rates and volumes for the economic life of the resource.

The pressures of the carrier fluid and reagents create cracks and fractures, 310. The solid particles are displaced such that more void space is locally enlarged. The enlarged void space changes the permeability of the area, as depicted in step 315. Steps 305, 310 and 315 are active during 100 and continue for a period of time after steps 150 or 160. In some instances, steps 320, 330, 340, 345, 350, and 355 can occur during the preceding steps of 100, 305, 310 and 315. Those skilled in the art understand that this description is a simplification and that other operational parameters or subterranean conditions can lead to the steps being sequenced in a different order. For example, spatially each of the steps described above could occur at the same time. For this embodiment, it is necessary for the formation water to be either hot and/or acidic for the chemical reactions to occur.

As the pressure of the subterranean formation begins to return toward the initial pressures, changes occur. For this example, the $CO_2$ gas begins to dissolve into the pre-existing hydrocarbon phase and water phase. The formation fluids begin to migrate after the injection has stopped. Step 320 depicts chemical reactions occurring in the formation along with formation fluids beginning to flow in different directions. The fluids move toward areas of lower potential at the rate dictated by the petrophysical properties of the newly created zones of cracks and fractures, some of which are filled with proppants and reagents. Some of the fluids that were displaced by the carrier fluid and the reagents will reinvade those same voids.

A $CO_2$ supercritical liquid injection is initiated, 325.

Step 330 depicts that the injection of the $CO_2$ and the changes in the chemical and physical properties of the fluids invoke a change in the direction of the flow of formation fluids.

Changes in chemistry of the formation fluids occur in step 335. The $CO_2$ becomes miscible with the hydrocarbon phase, lowering the interfacial tension and the hydrocarbon viscosity. The $CO_2$ that contacts the water phase gets partially dissolved and generates carbonic acid. The equations below describe the reactions:

$$CO_2(g) \leftrightarrow CO_2(aq)$$

$$CO_2(g)+H_2O(l) \leftrightarrow H_2CO_3(aq) \text{ (carbonic acid)}$$

$$H_2CO_3(aq) \leftrightarrow HCO_3^-(aq)+H^+(aq)$$

$$HCO_3^-(aq) \leftrightarrow CO_3^{2-}(aq)+H^+(aq).$$

When the formation water comes into contact with the magnesium, chemical reactions occur, 340. The equations below describe the reactions:

Magnesium+carbonic acid→magnesium carbonate+ hydrogen gas+heat $$Mg(s)+H_2CO_3(aq) \rightarrow MgCO_3(aq)+H_2(g).$$

Magnesium+water→magnesium hydroxide+hydrogen gas+heat $$Mg(s)+2H_2O(l) \rightarrow Mg(OH)_2(aq)+H_2(g).$$

These reactions generate heat and excess pressure due to density and phase changes (volume increases), 340. The increased localized pressure creates cracks and fractures by physically rearranging the solids, 345. These cracks and fractures connect up the surrounding flow networks in a new configuration, 350. The production of the MgCO3 and $Mg(OH)_2$ solution is not in equilibrium with the original formation fluids. The carbonate reacts with the water phase. The solubility of the alkaline earth metal and alkali metal cations (which are dissolved in pre-existing formation waters) is such that a precipitant of solid oxy-hydroxide-carbonate complex will form, which selectively plugs flow networks where more water is present than hydrocarbons. The flow channels wherein the predominant fluid is water will be blocked, 355.

The net result of the preceding steps modifies the flow networks such that the hydrocarbon phase is moving toward the pressure low at the wellbore, while the water (which is also trying to flow to the wellbore) generates blocks in the remaining water flowing network. This creates chemical reactions with the reagent to make new cracks and fractures, which increases the connectivity of the hydrocarbon phase network, 360. Increases in the connectivity of the hydrocarbon phase network and modification of the interfacial tension of the hydrocarbon phase allows more efficient drainage, along with reduced water flow.

Step 365 illustrates a decision point where one of two actions occurs. Either the hydrocarbons are preferentially produced at the wellbore, 370, or the cycle repeats: if the fluids are still in the subterranean formation, they continue to be involved in the steps beginning at step 330 and subsequent sequences.

EXAMPLE 4

An environment that maximizes generation, accumulation and production of methane is established by introducing $H_2$ in a subterranean formation. The microbial community is changed by the availability of $H_2$. The preferential flow enhancement of flowable hydrocarbon networks, with the flow disruption of the water networks, increases the environmental conditions for generation, accumulation and production of gas. The use of the reagents creates these changes in the flow networks, and provides for the addition of $H_2$. The reactions and physical changes of the reagent, as previously described, initiate microbial enhanced gas accumulation. However, the addition of different amendments or chemicals are optional but might be needed under some circumstances.

As the microbial activity progresses, the $CO_2$ reduction and the metabolism of larger hydrocarbon compounds to smaller hydrocarbon compounds ($CH_4$ included) establishes an environment where gas production occurs. These gases move away from the location of generation by buoyancy and capillary forces. The gases will continue to migrate until they are held back by the seal capacity of the subterranean formation. If accumulation continues, it is possible for the accumulation to become greater than the seal capacity. In that case, that accumulation stays at the same size by passing along any gas that makes the accumulation bigger than the seal capacity.

Figure 4:
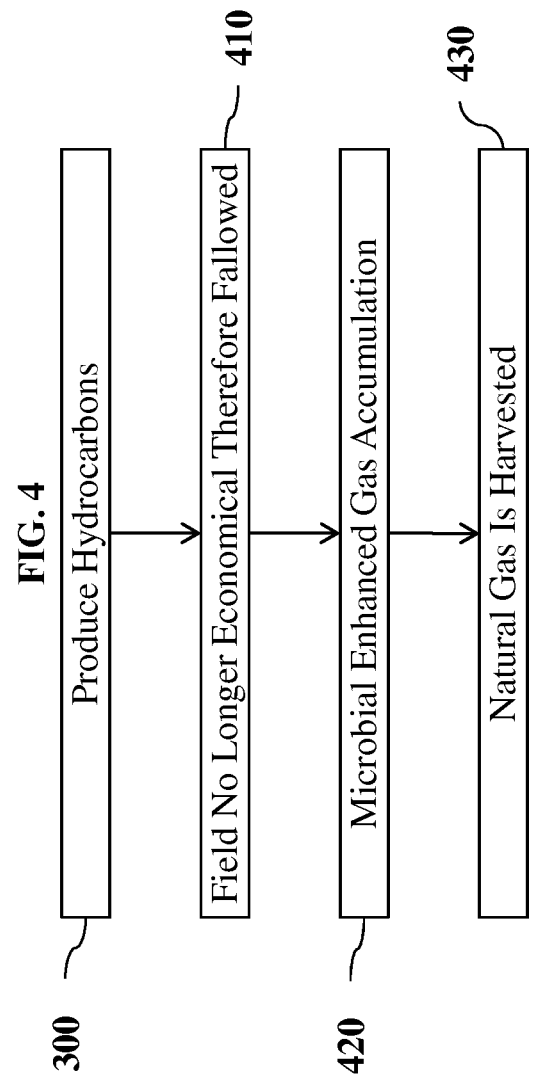
FIG. 4 is a block diagram of an embodiment illustrating microbial gas accumulation.
Figure 5:
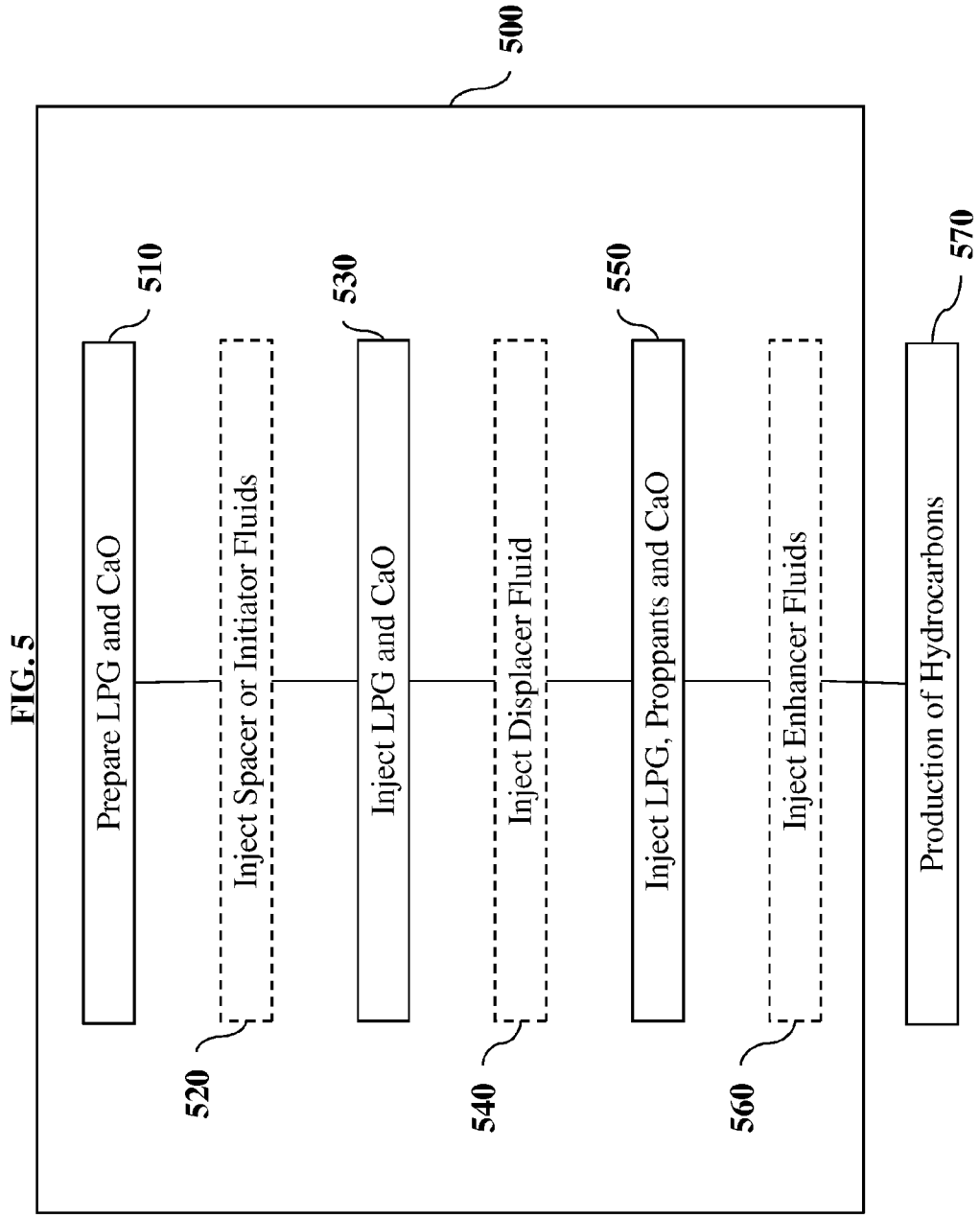
FIG. 5 is a block diagram of an embodiment illustrating the use of calcium oxide, CaO.

FIG. 4 depicts the steps of one embodiment to regenerate methane from exhausted production areas that were preconditioned with this method, 400. During step 300, $H_2$ gas is generated and $CO_2$ is injected. The combined operation of 300 removes as much of the recoverable hydrocarbons as possible and establishes a new network of conduits that links up the pore network containing residual hydrocarbons.

Step 410 depicts the time gap that occurs between the conclusion of active hydrocarbon recovery and the beginning of enhanced microbial methane generation. The processes of microbial methane gas generation are occurring before and during this resting time. The length of this period of time is determined by the many factors of the site-specific characteristics of the subterranean formation, including the composition of the fluids (aqueous phases, the hydrocarbon liquid phase, the hydrocarbon gas phase, inorganic gas phase and the biofilms), the microbial community, the pressures, temperatures and the degree to which the active hydrocarbon production has shifted the equilibrium away from the optimal methane generation. During this time, measurements of in-situ chemical, biological, hydrological, and physical parameters are conducted. Analysis of these measurements leads to decisions regarding how to optimize resource recovery through operations. Injection of $CO_2$ for carbon sequestration may occur at this time.

The supply of $H_2$ and $CO_2$ in 300 along with the establishment of a new network of flow conduits (biased to those where residual hydrocarbons reside) not only optimizes hydrocarbon recovery, but poises and conditions the subsurface for microbial enhanced gas accumulation, 420. Therefore, 300 could be applied up to step 360 to already depleted reservoirs (in other words, step 370 is not necessary). During step 410, in that instance, analysis of site specific measurements reveals the operational approach to maximize methane recovery.

During step 430, the existing infrastructure can be used with minor modifications. The newly generated methane will flow to the wellbore once enough of the methane has accumulated in the subsurface.

The network of residual hydrocarbons, along with formation fluids saturated or super saturated with $H_2$ and/or $CO_2$, establishes an environment where the population distribution of the microbial community is modified to create increased methane and $H_2$ production.

EXAMPLE 5

In the case of an older asset located in a carbonate vuggy formation, the resources can be recovered efficiently by the following method: in step 510 a mixture of LPG and calcium oxide, CaO, is prepared. CaO is an attractive reagent due to its low cost and the ability for lime manufacturers to produce a specific size and gradation. Tailoring the CaO for the petrophysical properties of the vuggy carbonate reservoir ensures optimal placement and reactivity. The mixture can be as high as 50% CaO weight/LPG volume. Injection of the mixture is performed in step 530. Once the targeted flow rate and volume and pressures are achieved, the well is prepared for step 550. In step 550 a mixture of LPG, proppants and CaO is injected. The fraction sizes and proportions of CaO, combined with the proppants and the LPG, is dependent upon the geological composition of the formation, the geochemistry of the formation waters and the chemical and physical properties of the hydrocarbon fluids. The temperature and pressures of the formation fluids are also key factors that dictate the ratios of the components of the slurry in step 550.

When the CaO comes into contact with water, slaking occurs. Slaking is the process of converting CaO solid with $H_2O$ to form aqueous $Ca^+$ and $OH^-$ solution. This is an exothermic reaction that consumes water and produces $OH^-$. The high pH and temperature: 1) blocks water; and 2) increases the hydrocarbon's mobility to travel to the well. The reactions of the oxides and the native minerals of the rock will produce $H_2$.

Optional steps in the process are: 520, injection of spacer or initiator fluids; 540, injection of displacer fluid; and 560, injection of enhancer fluids. The spacer or initiator fluids can prepare the subsurface for the following steps. Displacer fluids are used for moving the previously injected materials. Enhancer fluids are used to trigger reactions or to increase the effectiveness of the byproducts of the reaction.

Production of the hydrocarbon, 560 is initiated once injections are completed and the system is given enough time to properly react. Time is required for the sealing of the water zones and increasing the pressures due to reactions of the reagents with the subsurface materials.

EXAMPLE 6

FIG. 6 is a flow chart illustrating the next example. Step 600 reflects the acquisition and analysis of data. Information ranges in size and scope. Vast areas are characterized by seismic data and interpretation. Meanwhile, microscopic information is gained with core samples and fluid analysis for a specific well.

In step 610, analyses of the data are the basis for the design of the stimulation operation. The design of the system can be done with the assistance of a 3D fracture simulation program. Those skilled in the art can readily practice the present invention with the assistance of a simulation program. The characteristics of the subterranean fluids and formation to be stimulated are assigned into the simulator. Several different candidates of solids and fluids are chosen. The properties of the different fluids and solids, along with different operational parameters (injection rates, durations, number of stages etc.) are tested with the model. Once the analysis is complete, the preferred method is formulated in step 620. An example of the outcome of such of a process could be the selection of Ca metal suspended in a diesel fluid. The number of stages of injections and composition, volume and resting periods are initially determined.

The solution is made and injected as the first stage, steps 630 and 640. The injection rate is such that the breakdown pressure of the formation is maintained for a period of time ($t_1$). The volume of the solution injected ($V_1$) is a function of the average injection rate ($IR_1$) and $t_1$. The effective volume of the formation that the solution has invaded is a function of the degree of saturation of the process mixture ($S_{pm}$) in the newly created cracks and fractures, new void volume (NVV) and the non-impacted porosity, (POR). For example, 60% of the NVV is filled with the process mixture and 10% of POR is filled. The POR volume is 15% of the volume of the influenced zone.

After a period of time ($t_2$), the pressure in the formation has reached desired value. Information gained from the first stage is compared to the results of previous analyses, step 650. If there are no major deviations, then the initial formulation of the second stage can be used. Otherwise, the simulation is updated to match the observations and the results of new simulation are used. Additional stages are therefore required, and stimulation is not complete, step 660.

Taking advantage of knowledge gained by the analysis, additives are mixed with the diesel fluid to be compatible with the formation and able to displace the previously injected Ca metal further into the formation, steps 620 and 630. As injection of the second stage ($IR_2$) is occurring, monitoring of down-hole pressures indicate how the formation is responding, step 640. Pressure and injection rates' responses indicate if the formation is creating larger voids and/or if chemical reactions are generating increased pressures. For instance, if injection rates are lowered close to zero, and down-hole pressures rise significantly, it can be assumed that out in the formation, water reacted with the Ca metal to produce $H_2$ gas and heat and $OH^-$. If immediately subsequent to that, there was a sudden decrease in pressure, it can be assumed that new cracks and fractures were generated which allowed the excess fluid pressure to be decreased by the formation of new void volume. The volume ($V_2$) is dependent on the average injection rate ($IR_2$) and the duration ($t_3$).

The analysis of the data is used to define the next stage, step 650. The 3D fracture simulator, when matching the observations, indicates that a next stage can utilize a similar formulation of the first stage by replacing some of the diesel with a selected proppant. The mixture is optimized for the placement of the proppant in pre-existing fractures and enlarged fractures. The enlarged fractures are created following the weaker areas created in the hydrocarbon connected zones. The zones in the hydrocarbon saturated zones are a result of the cementation of the zones where water came into contact with the Ca metal and reacted to form oxy-hydroxide-carbonates that cement grains and create blocks in water flow. The reactions also make the hydrocarbon phase less viscous and lower the interfacial tension.

In step 620 the volume ($V_3$) is prepared based on a period of time ($t_5$) and an average injection rate of $IR_3$. The duration of rest time ($t_4$) is established to allow some of the diesel to dissipate into the existing hydrocarbon phase and/or be displaced by water flowing networks. Before starting this injection, monitoring of the pressures and temperatures along with other fracturing monitoring information is used to determine the performance of subsurface activity and the appropriate duration. Injecting the mixture not only fills previous voids, but creates new fractures. These new fractures are more effective at distal radial fracture creation, enlargement and growth due to chemical reactions of the previous two stages and the resting periods between. The proppants' placement reaches further into the hydrocarbon zones because of the previous chemical and physical actions of the reagents with the formation waters. The mixture is created and injected in steps 630 and 640.

The monitoring data from the third injection is analyzed, step 650. In this case the data indicates that a connection to a water flowing network was encountered. An indication that this has occurred is a rapid drop of pressure during injection. Other information is used to confirm the conclusion that a water flowing network with high permeability was intercepted. Taking into consideration all of the information available, it is determined that stimulation is not complete, step 660.

In step 620 a new formulation and specifications for the next injection is made. Concentrated slurry of CaO is prepared in a water based hydraulic fracturing fluid, step 630. This formulation is designed specifically for traveling along previously fractured zones and preferentially entering those pore networks that were filled with water before the fracturing operation. The monitoring data is used to determine the volume of slurry to be injected ($V_4$). Additionally, there are core experiments and other laboratory tests that can be used to set the "healing time." The "healing time" is the amount of time needed for this slurry solution to react with the brines, water and minerals of the formation for the hardening of the newly formed precipitates that form the cements between the subsurface and the by-products of the reactions of the injected materials.

Further analysis also may reveal that the well should flow for a specified period of time, $t_6$, to allow the formation fluids to partially purge back the fluids that were previously injected. For a period of time, $t_7$, the CaO slurry is injected at an average injection rate, $IR_4$, step 640.

Using the monitoring data, the lab data, and analysis that might include geochemical and geomechanical and other computer models, the system is allowed to rest for the appropriate setting up (chemical curing) of the subsurface. This "healing time" allows for the optimal conditioning of the subsurface for the next phase.

Analyzing the information gained to date, a fifth and final injection is formulated, step 650, and details of deployment are specified, step 620. The Ca metal and diesel solution is injected for a period of time, $t_8$, at an average injection rate of $IR_5$ for the resulting placement of a volume $V_5$, steps 630 and 640.

After the fifth injection has been completed, it is decided that stimulation is complete, step 660. The well goes through a "cleanup" period after which it begins producing hydrocarbons.

This example illustrates that adaptation of the plan sometimes requires a change in reagents and carrier fluids based upon observation of the operational performance during the stimulation operation. The data and observations during the production of the hydrocarbons can also be used to apply an additional stimulation on the same well or to apply a stimulation operation to another well. The table below summarizes the stages of this example.

| Stage | Mixture | Wait Time | Feature | Parameters |
|---|---|---|---|---|
| 1 | Ca in diesel | — | Impregnate pores with Ca | $t_1, V_1, IR_1$ |
| 2 | Diesel | $t_2$ | Create Ca halo in outer region | $t_3, V_2, IR_2$ |
| 3 | Ca & proppant in diesel | $t_4$ | Create radial propped open fractures with Ca in propped system and in outer halo | $t_5, V_3, IR_3$ |
| 4 | CaO in water | $t_6$ | Mitigate connection with flowing water | $t_7, V_4, IR_4$ |
| 5 | Ca in diesel | $t_8$ | Connect up hydrocarbon network with the infusion of unreacted Ca in place | $t_9, V_5, IR_5$ |

CONCLUSION, RAMIFICATIONS AND SCOPE

Thus the reader will see that at least one embodiment of the methods for improving hydrocarbon recovery and providing an environmentally beneficial and cost effective resource utilization cycle. The advantages of employing this technique are:

1. Creates fractures that connect up targeted fluid (e.g. hydrocarbons) flowing networks initially and dynamic response to changes in fluid composition of pore network,
2. As the production of hydrocarbon progresses, dynamically blocking off fractures or flow networks of unwanted water,
3. Opens up restrictions to hydrocarbon flow by removing paraffin, asphaltene and other inorganic and organic compounds,
4. Makes the surface tension and viscosity better to connect up bodies of hydrocarbons to flow to the well,
5. Makes portions of hydrocarbons more water soluble for improved rates of $CH_4$ generation,
6. Stimulates biogenic $CH_4$ with the introduction of $H_2$,
7. Establishes a new network that facilitates the micro accumulation of gas to migrate to location of accumulation for the economic recovery of natural gases.

While my above description contains much specificity, these should not be construed as limitations on the scope, but rather as an exemplification of several of the embodiments thereof. Many other variations are possible. This method can be applied to situations where there are no native hydrocarbons in existence. In those cases, the method can be used to preferentially recover a resource and also stimulate biogenic gas. One example could be in the use of solution mining of an element and at the same time using the subsurface for the sequestration of $CO_2$. The carrier fluid and the reagents are used to reorganize the flow networks and the byproducts of the reagent reactions generate the $H_2$ to combine with $CO_2$ in a biological process to generate methane. These methods can also be applied to both producers and injector wells. This technique can be used for leach pad operations, solution mining, geothermal activities, environmental cleanup, coal resource utilization and water resources. It is not necessary that this technique be used in a fracturing operation.

A person skilled in the art, particularly one having the benefit of the teachings of this patent, will recognize many modifications and variations to the specific embodiments described above. The specifically described embodiments should not be used to limit or restrict the scope of the invention, which is to be determined by the claims below and their legal equivalents.

CITATION LIST

Patent Literature

U.S. Pat. No. 2,218,306, Austerman et al., Method Of Treating Oil Wells, Oct. 15, 1940
U.S. Pat. No. 2,672,201, Loreiiz et al., Increasing Production Of Oil Wells, Mar. 16, 1954
U.S. Pat. No. 2,799,342, Fatt, Process For Treating Oil Well, Jul. 16, 1957
U.S. Pat. No. 2,872,982, Wade, Method For Improving Production Of Wells, Feb. 10, 1959
U.S. Pat. No. 2,881,837, Staudt, Method Of Fracturing Oil Wells, Apr. 14, 1959
U.S. Pat. No. 2,889,884, Henderson, Process For Increasing Permeability Of Oil Bearing Formation, Jun. 9, 1959
U.S. Pat. No. 3,386,511, Messina, Production Stimulation Method For Oil Wells, Jun. 4, 1968
U.S. Pat. No. 3,896,879, Sareen, Stimulation Of Recovery From Underground Deposits, Jul. 29, 1975
U.S. Pat. No. 4,007,791, Johnson, Method For Recovery Of Crude Oil From Oil Wells, Feb. 15, 1977
U.S. Pat. No. 4,085,799, Bousaid et al., Oil Recovery Process By In Situ Emulsification, Apr. 25, 1978
U.S. Pat. No. 4,448,253, Southwick et al., Moderated Borohydride-Induced Reservoir Dewatering, May 15, 1984
U.S. Pat. No. 4,590,997, Stowe, Controlled Pulse And Peroxide Fracturing Combined With A Metal Containing Proppant, May 27, 1986
U.S. Pat. No. 4,634,540, Ropp, Composition And Method For Modifying And Augmenting Recovery Of Hydrocarbons From Hydrocarbon-Bearing Formations, Jan. 6, 1987
U.S. Pat. No. 4,848,468, Hazlett et al., Enhanced Hydraulic Fracturing Of A Shallow Subsurface Formation, Jul. 18, 1989
U.S. Pat. No. 5,083,615, McLaughlin et al., Aluminum Alkyls Used To Create Multiple Fractures, Jan. 28, 1992
U.S. Pat. No. 5,322,121, Hrachovy, Hydraulic Fracturing Technique Employing In Situ Precipitation, Jun. 21, 1994
U.S. Pat. No. 5,979,557, Card et al., Methods For Limiting The Inflow Of Formation Water And For Stimulating Subterranean Formations, Nov. 9, 1999
U.S. Pat. No. 6,444,316, Reddy et al., Encapsulated Chemicals For Use In Controlled Time Release Applications And Methods, Sep. 3, 2002
U.S. Pat. No. 6,543,535, Converse et al., Process For Stimulating Microbial Activity In A Hydrocarbon-Bearing, Subterranean Formation, Apr. 8, 2003
U.S. Pat. No. 6,966,379, Chatterji et al., Methods Of Fracturing A Subterranean Formation Using A Ph Dependent Foamed Fracturing Fluid, Nov. 22, 2005
U.S. Pat. No. 7,210,528, Brannon et al., Method Of Treatment Subterranean Formations Using Multiple Proppant Stages Or Mixed Proppants, May 1, 2007
U.S. Pat. No. 7,341,103, Taylor et al., Compositions And Methods For Treating Subterranean Formations With Liquefied Petroleum Gas, Mar. 11, 2008
U.S. Pat. No. 7,393,423, Liu, Use Of Aluminum In Perforating And Stimulating A Subterranean Formation And Other Engineering Applications, Jul. 1, 2008
U.S. Pat. No. 7,458,424, Odeh et al., Tight Formation Water Shut Off Method With Silica Gel, Dec. 2, 2008
U.S. Pat. No. 7,533,723, Hughes et al., Wellbore Treatment Fluid, May 19, 2009
U.S. Pat. No. 7,581,594, Tang, Surfactant Method For Improved Oil Recovery From Fractured Reservoirs, Sep. 1, 2009
U.S. Pat. No. 7,588,081, Pfeiffer et al., Method Of Modifying Permeability Between Injection And Production Wells, Sep. 15, 2009
U.S. Pat. No. 7,624,743, Sarkar et al., Methods And Compositions For Thermally Treating A Conduit Used For Hydrocarbon Production Or Transmission To Help Remove Paraffin Wax Buildup, Dec. 1, 2009
U.S. Pat. No. 7,640,978, Pfeiffer et al., Biogenic Fuel Gas Generation In Geologic Hydrocarbon Deposits, Jan. 5, 2010
U.S. Pat. No. 7,798,221, Vinegar et al., In Situ Recovery From A Hydrocarbon Containing Formation, Sep. 21, 2010
U.S. Pat. No. 7,946,342, Robertson, In Situ Generation Of Steam And Alkaline Surfactant For Enhanced Oil Recovery Using An Exothermic Water Reactant (EWR), May 24, 2011

U.S. Pat. No. 7,977,056, Toledo et al., Methods Of Identifying Stimulants For Biogenic Methane Production From Hydrocarbon-Bearing Formations, Jul. 12, 2011 U.S. Pat. App. 20040033557, Scott et. al, Method of generating and recovering gas from subsurface formations of coal, carbonaceous shale and organic-rich shales, Feb. 19, 2004

Non Patent Literature

DOLFING et. al, Thermodynamic constraints on methanogenic crude oil biodegradation, The ISME Journal, 2007, 442-452, 2(4), Nature Publishing Group, USA FINK et. al, Chapter 17 Hydraulic Fracturing, Oil Field Chemicals, 2003, 233-275, Gulf Professional Pub., USA HOLOWENKO et. al, Naphthenic acids and surrogate naphthenic acids in methanogenic microcosms, Water Research, 2001, 2595-2606, 35(11), Elsevier Ltd., USA LÖFFLER et. al, Chapter 13 Analysis of Trace Hydrogen Metabolism, Methods in Enzymology, 2005, 222-237, 397, Elsevier Inc., USA WINFREY et. al, Association of hydrogen metabolism with methanogenesis in Lake Mendota sediments, Applied and Environmental Microbiology, 1977, 312-318, 33(2), American Society for Microbiology, USA

What is claimed is:

1. A method of removing indigenous water and increasing hydrocarbon recovery from a well having a top surface structure, a wellbore with or without casing and an opening in the wellbore into a subterranean geological formation comprising:
    a) providing a mixture of a liquid petroleum transport carrier and at least one reagent that when reacted with water produces heat, hydroxide compound(s) and hydrogen;
    b) injecting for a time the mixture into the wellbore in sufficient quantity and at a sufficient flow rate cause the mixture to move into the geological formation through the wellbore opening and result in measurable reaction of the at least one reagent with indigenous mineral-containing water in the formation to generate heat and $OH^-$;
    c) ceasing injection of the mixture and shutting in the wellbore to allow thee wellbore pressure to drop and allow the mixture to expand into the geological formation.

2. The method of claim 1 wherein the at least one reagent is selected from the group consisting of: alkali metals, alkaline earth metals, alkali metal hydrides, alkaline earth metal hydrides, metal hydrides, complex hydrides of alkali metals and aluminum, complex hydrides of alkaline earth metal and aluminum, complex hydrides of alkali metal and lithium, hydrides of alkaline metal and lithium, hydrides of alkali metal and boron, hydrides of alkaline metal and boron, alkali metal oxide, alkaline earth metal oxide, alkali metal hydroxide, alkaline earth metal hydroxide and combinations thereof.

3. The method of claim 1 also comprising injecting into the wellbore a displacement fluid that is not reactive with the at least one reagent after ceasing injection of the mixture of transport carrier fluid and reagent in c).

4. The method of claim 3 also comprising injecting into the wellbore a mixture of the liquid hydrocarbon fluid, at least one reagent and, proppants following the injection of the displacement fluid that is not reactive with the at least one reagent.

5. The method of claim 1 the mixture of at least one reagent, liquid hydrocarbon transport carrier fluid is injected for sufficient time to allow indigenous water in the formation to react with the reagent to raise the pH of the indigenous water in the area of reaction to produce solid precipitates of mineral dissolved in the indigenous water.

6. The method of claim 3 also comprising injecting an enhancer fluid after injection of the displacement fluid wherein the enhancer fluid will initiate or accelerate the reaction of the at least one reagent with indigenous water in the geological formation after injection of the displacement fluid.

7. A method of removing indigenous water and increasing hydrocarbon recovery from a well having a top surface structure, a wellbore with or without casing and an opening in the wellbore into a subterranean geological formation comprising:
    a) providing a mixture of a water-based transport carrier liquid supersaturated with carbon dioxide ($CO_2$) and at least one reagent that does not react with water at ambient conditions existing at the wellbore surface but does react with water at the conditions of temperature and pH existing in the geological formation to produce heat, hydroxide compound(s) and hydrogen;
    b) injecting the mixture for a time into the wellbore in sufficient quantity and at a sufficient flow rate cause the mixture to move into the geological formation through the wellbore opening and result in measurable reaction of the at least one reagent with indigenous mineral-containing water in the formation to generate heat and $OH^-$;
    c) ceasing injection of the mixture and shutting in the wellbore to allow the wellbore pressure to drop and allow the mixture to expand into the geological formation.

8. The method of claim 7 wherein the at least one reagent is selected from the group consisting of finely divided calcium (Ca), magnesium (Mg) and Aluminum (Al), oxides of calcium, magnesium or aluminum and combinations thereof.

9. The method of claim 7 also comprising injecting into the wellbore a displacement fluid that is not reactive with the at least one reagent after ceasing injection of the mixture of transport carrier fluid and reagent in c).

10. The method of claim 8 also comprising injecting into the wellbore a mixture of at least one reagent, water-based transport carrier fluid supersaturated with $CO_2$ and proppants following the injection of the displacement fluid.

11. The method of claim 7 wherein the mixture of at least one reagent, water-based transport carrier fluid supersaturated with $CO_2$ is injected for sufficient time to allow indigenous water in the formation to react with the reagent to raise the pH of the indigenous water in the area of reaction to produce solid precipitates of mineral anions and cations dissolved in the indigenous water.

12. The method of claim 8 also comprising injecting an enhancer fluid after injection of the displacement fluid wherein the enhancer fluid will initiate or accelerate the reaction of the at least one reagent with indigenous water in the geological formation after injection of the displacement fluid.

13. A method of removing water and increasing hydrocarbon recovery from a well having a top surface structure, a wellbore with or without casing and an opening in the wellbore into a subterranean geological formation comprising:
    a) pressuring the wellbore to a pressure that will maintain supercritical carbon dioxide ($CO_2$) in the supercritical state;
    b) providing a mixture of supercritical $CO_2$ and at least one reagent that when reacted with water produces heat and hydroxide compound(s);
    c) injecting the mixture for a time, in the absence of water, under pressure into the wellbore in sufficient quantity and at a sufficient flow rate to maintain the pressure sufficiently high to maintain the supercritical $CO_2$ in a supercritical state and to cause the mixture to move into the geological formation through the wellbore opening and result in measurable reaction of the at least one reagent with indigenous mineral-containing water in the formation to generate heat and $OH^-$;

d) ceasing injection of the mixture of supercritical $CO_2$ and at least one reagent and shutting in the wellbore to allow the wellbore pressure to drop and allow the mixture to expand into the geological formation.

14. The method of claim 13 wherein the at least one reagent is selected from the group consisting of: alkali metals, alkaline earth metals, alkali metal hydrides, alkaline earth metal hydrides, metal hydrides, complex hydrides of alkali metals and aluminum, complex hydrides of alkaline earth metal and aluminum, complex hydrides of alkali metal and lithium, hydrides of alkaline metal and lithium, hydrides of alkali metal and boron, hydrides of alkaline metal and boron, alkali metal oxide, alkaline earth metal oxide, alkali metal hydroxide, alkaline earth metal hydroxide and combinations thereof.

15. The method of claim 13 also comprising injecting into the wellbore a displacement fluid that is not reactive with the at least one reagent after ceasing injection of the mixture of supercritical $CO_2$ and reagent in d).

16. The method of claim 15 also comprising injecting into the wellbore a mixture of a at least one reagent, supercritical $CO_2$ and proppants following the injection of the displacement fluid that is not reactive with the at least one reagent.

17. The method of claim 13 the mixture of supercritical $CO_2$ and at least one reagent is injected for sufficient time to allow indigenous water in the formation to react with the reagent to raise the pH of the indigenous water in the area of reaction and to produce solid precipitates of mineral previously dissolved in the indigenous water.

18. The method of claim 13 also comprising flushing the wellbore with a non-aqueous fluid prior to step a) to remove water and other debris.

19. The method of claim 15 also comprising injecting an enhancer fluid after injection of the displacement fluid wherein the enhancer fluid will initiate or accelerate the reaction of the at least one reagent with indigenous water in the geological formation after injection of the displacement fluid.

20. A method of removing water and increasing hydrocarbon recovery from a well having a top surface structure, a wellbore with or without casing and an opening in the wellbore into a subterranean geological formation comprising:

a) pressuring the wellbore to a pressure that will maintain liquefied petroleum gas (LPG) in the liquid state;

b) providing a mixture of LPG and at least one reagent that when reacted with water produces heat and hydroxide compound(s);

c) injecting the mixture for a time, in the absence of water, under pressure into the wellbore in sufficient quantity and at a sufficient flow rate to maintain the pressure sufficiently high to maintain the liquefied petroleum gas in a liquid state and to cause the mixture to move into the geological formation through the wellbore opening and result in measurable reaction of the at least one reagent with indigenous mineral-containing water in the geological formation to generate heat and hydroxide ions ($OH^-$;

d) ceasing injection of the mixture of liquefied petroleum gas and at least one reagent and shutting in the wellbore to allow the wellbore pressure to drop and allow the mixture to expand into the geological formation.

21. The method of claim 20 wherein the at least one reagent is selected from the group consisting of: alkali metals, alkaline earth metals, alkali metal hydrides, alkaline earth metal hydrides, metal hydrides, complex hydrides of alkali metals and aluminum, complex hydrides of alkaline earth metal and aluminum, complex hydrides of alkali metal and lithium, hydrides of alkaline metal and lithium, hydrides of alkali metal and boron, hydrides of alkaline metal and boron, alkali metal oxide, alkaline earth metal oxide, alkali metal hydroxide, alkaline earth metal hydroxide and combinations thereof.

22. The method of claim 20 also comprising injecting into the wellbore a displacement fluid that is not reactive with the at least one reagent after ceasing injection of the mixture of liquefied petroleum gas and reagent in d).

23. The method of claim 22 also comprising injecting into the wellbore a mixture of at least one reagent, liquefied petroleum gas and proppants following the injection of the displacement fluid.

24. The method of claim 20 wherein the mixture of liquefied petroleum gas and at least one reagent is injected for sufficient time to allow indigenous water in the formation to react with the reagent to raise the pH of the indigenous water in the area of reaction to produce solid precipitates of mineral anions and cations previously dissolved in the indigenous water.

25. The method of claim 20 also comprising flushing the wellbore with a non-aqueous fluid prior to step a) to remove water and other debris.

26. The method of claim 20 also comprising injecting an enhancer fluid following injection of the displacement fluid wherein the enhancer fluid will initiate or accelerate the reaction of the at least one reagent with indigenous water in the geological formation after injection of the displacement fluid.

27. A method of removing water and increasing hydrocarbon recovery from a well having a top surface structure, a wellbore with or without casing and an opening in the wellbore into a subterranean geological formation comprising:

a) pressuring the wellbore to a pressure that will maintain liquefied petroleum gas (LPG) in the liquid state;

b) providing a mixture of LPG and calcium oxide (CaO);

c) injecting the mixture of LPG and CaO under pressure, in the absence of added water, into the wellbore in sufficient quantity and at a sufficient flow rate to maintain the pressure sufficiently high to maintain the liquefied petroleum gas in a liquid state and to cause the mixture to move into the geological formation through the wellbore opening and result in measurable reaction of the CaO with indigenous mineral-containing water in the geological formation to form an aqueous solution of $Ca^+$ and $OH^-$;

d) ceasing injection of the mixture of liquefied petroleum gas and CaO and shutting in the wellbore to allow the wellbore pressure to drop and allow the mixture of LPG and CaO to expand into the geological formation.

28. The method of claim 27 also comprising injecting into the wellbore a displacement fluid that is not reactive with CaO after ceasing injection of the mixture of liquefied petroleum gas and CaO in d).

29. The method of claim 28 also comprising injecting into the wellbore a mixture of CaO, liquefied petroleum gas and proppants following the injection of the displacement fluid.

30. The method of claim 27 wherein the mixture of liquefied petroleum gas and CaO is injected for sufficient time to allow indigenous water in the formation to react with CaO to raise the pH of the indigenous water in the area of reaction and to produce solid precipitates of mineral anions and cations previously dissolved in the indigenous water.

31. The method of claim 27 wherein the mixture of CaO and liquefied petroleum gas is between 1% and 50% CaO weight/liquefied petroleum gas volume.

32. The method of claim 27 comprising flushing the wellbore with a non-aqueous fluid prior to step a) to remove water and other debris.

33. The method of claim 28 also comprising injecting an enhancer fluid following injection of the displacement fluid wherein the enhancer fluid will initiate or accelerate the reaction of CaO with indigenous water in the formation.

* * * * *